US012659027B2

(12) United States Patent
Wang et al.

(10) Patent No.: US 12,659,027 B2
(45) Date of Patent: Jun. 16, 2026

(54) TECHNIQUES FOR INDICATING BACKSCATTERING TIMING

(71) Applicant: QUALCOMM Incorporated, San Diego, CA (US)

(72) Inventors: Xiaojie Wang, Hillsborough, NJ (US); Jing Sun, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 18/160,567

(22) Filed: Jan. 27, 2023

(65) Prior Publication Data

US 2024/0259090 A1    Aug. 1, 2024

(51) Int. Cl.
| | |
|---|---|
| *H04B 7/22* | (2006.01) |
| *H02J 50/20* | (2016.01) |
| *H04W 56/00* | (2009.01) |

(52) U.S. Cl.
CPC .............. *H04B 7/22* (2013.01); *H02J 50/20* (2016.02); *H04W 56/001* (2013.01)

(58) Field of Classification Search
CPC ......... H04B 7/22; H02J 50/20; H04W 56/001
USPC ....................................................... 370/328
See application file for complete search history.

(56) References Cited

U.S. PATENT DOCUMENTS

| | | | | |
|---|---|---|---|---|
| 10,211,679 B1* | 2/2019 | Li | .......................... | H02J 50/001 |
| 2020/0178171 A1* | 6/2020 | Lou | ....................... | H04W 76/28 |

| | | | | |
|---|---|---|---|---|
| 2020/0280953 A1* | 9/2020 | Luo | ...................... | G01S 5/02213 |
| 2021/0019585 A1* | 1/2021 | Shakedd | .............. | G06F 21/602 |
| 2021/0368439 A1* | 11/2021 | Karimaruthumkal | ........................ | |
| | | | | H04L 5/0055 |
| 2021/0409130 A1* | 12/2021 | Greene | .................. | H04B 17/23 |
| 2023/0254886 A1* | 8/2023 | Gupta | .............. | H02J 13/00002 |
| | | | | 370/329 |
| 2023/0378807 A1* | 11/2023 | Wang | ...................... | H04W 4/80 |
| 2023/0379901 A1* | 11/2023 | Wang | .................. | H02J 13/1331 |

(Continued)

FOREIGN PATENT DOCUMENTS

| | | | | | |
|---|---|---|---|---|---|
| CA | 2533975 A1 * | 7/2006 | .............. | H04M 1/73 |
| NO | 345015 B1 * | 8/2020 | .............. | H02J 50/80 |

(Continued)

OTHER PUBLICATIONS

Dinh Thi Thuy Nga et al (No. 345015 B1), Method and System for Controlling an Energy Harvesting Operation in a Wireless Terminal Device, Aug. 24, 2020, All pages and figures. (Year: 2020).*

*Primary Examiner* — Mahendra R Patel
(74) *Attorney, Agent, or Firm* — Holland & Hart LLP

(57) ABSTRACT

Methods, systems, and devices for wireless communication are described. In some examples, an energy transfer device may indicate timing information for backscattering a signal. The energy transfer device may transmit, to an energy harvesting device, a message including timing information that indicates when the energy harvesting device is to begin backscattering of a wireless signal. The energy transfer device may transmit the wireless signal. The energy harvesting device may monitor for and receive the wireless signal based on the message. The energy harvesting device may transmit a backscattered signal based on application of a backscattering function to the wireless signal in accordance with the timing information.

30 Claims, 19 Drawing Sheets

(56)                    References Cited

U.S. PATENT DOCUMENTS

2023/0397017 A1 *  12/2023  Elshafie ................ H04W 72/23
2024/0106532 A1 *   3/2024  Mahalingam ..... H04W 52/0229
2024/0163840 A1 *   5/2024  Säily ....................... G01S 7/006
2024/0171006 A1 *   5/2024  Patchava ................ H04B 17/30
2024/0176963 A1 *   5/2024  Fahim .................. G01S 13/758
2024/0267113 A1 *   8/2024  Dees ..................... H04W 88/06
2025/0063599 A1 *   2/2025  Wei ....................... H04W 48/12

FOREIGN PATENT DOCUMENTS

TW           201019628 A  *  5/2010   .............. H04B 5/26
WO   WO-2016034772 A1 *  3/2016   ............ G08C 17/02
WO   WO-2017059540 A1 *  4/2017   ......... A61N 1/37223
WO   WO-2021174215 A1 *  9/2021   ............. H02J 50/27
WO   WO-2022170267 A1 *  8/2022   ....... H04W 52/0245
WO   WO-2024145909 A1 *  7/2024   ............ H04W 12/12

* cited by examiner 210-a 115-a 210-b 105-a

205

Energy
Harvesting
Device 210-c 110-a

215    Message

220    Feedback Message

225    Wireless Signal

230    Backscattered Signal

Receive Energy

Backscattered
Signal

200

300-a 300-b 910                    920                    915

905

900

130

105

115

Network
Entity

Transceiver

1310

Antenna

1315

Communications
Manager

1320

Memory

Code

1330

1325

1340

Processor

1335

1305

1300

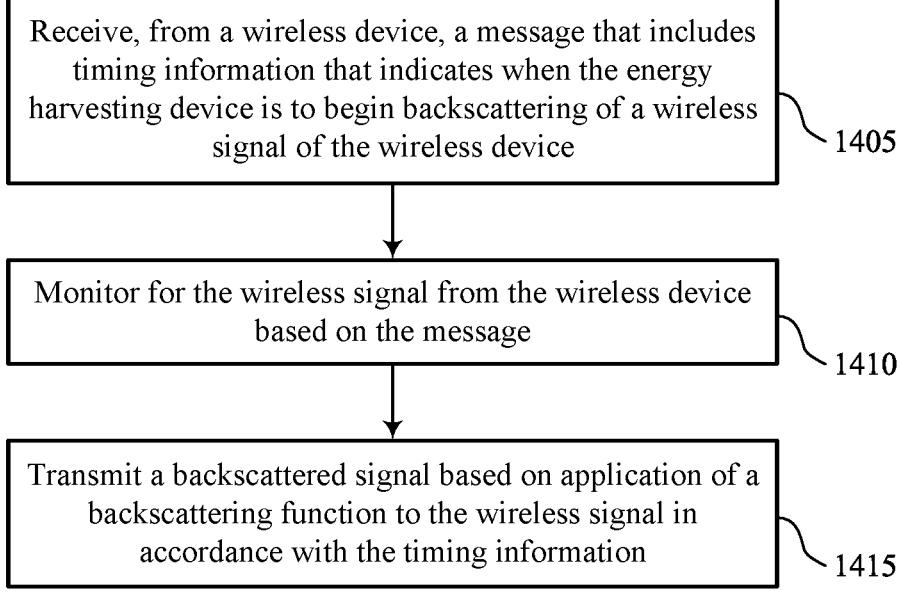

Receive, from a wireless device, a message that includes timing information that indicates when the energy harvesting device is to begin backscattering of a wireless signal of the wireless device

1405

Monitor for the wireless signal from the wireless device based on the message

1410

Transmit a backscattered signal based on application of a backscattering function to the wireless signal in accordance with the timing information

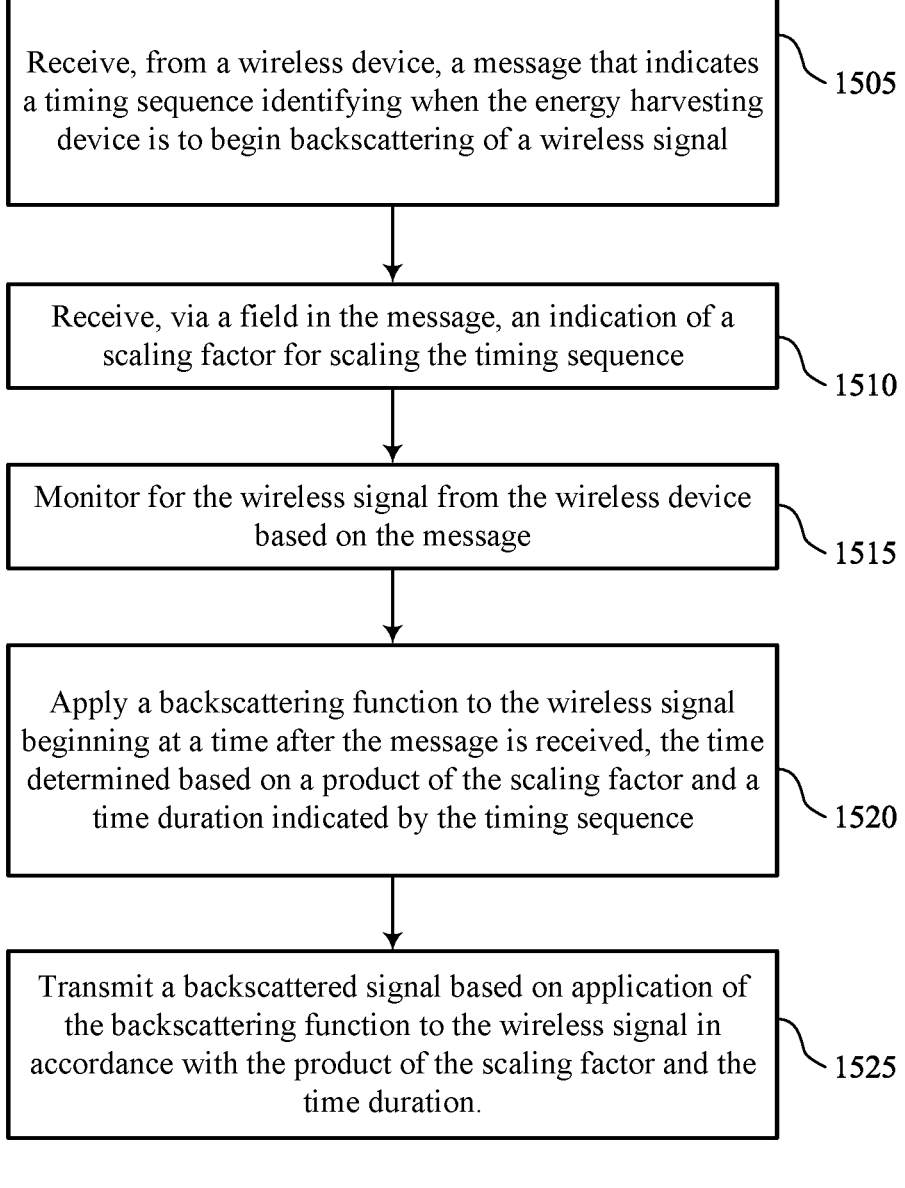

Receive, from a wireless device, a message that indicates a timing sequence identifying when the energy harvesting device is to begin backscattering of a wireless signal

1505

Receive, via a field in the message, an indication of a scaling factor for scaling the timing sequence

1510

Monitor for the wireless signal from the wireless device based on the message

1515

Apply a backscattering function to the wireless signal beginning at a time after the message is received, the time determined based on a product of the scaling factor and a time duration indicated by the timing sequence

1520

Transmit a backscattered signal based on application of the backscattering function to the wireless signal in accordance with the product of the scaling factor and the time duration.

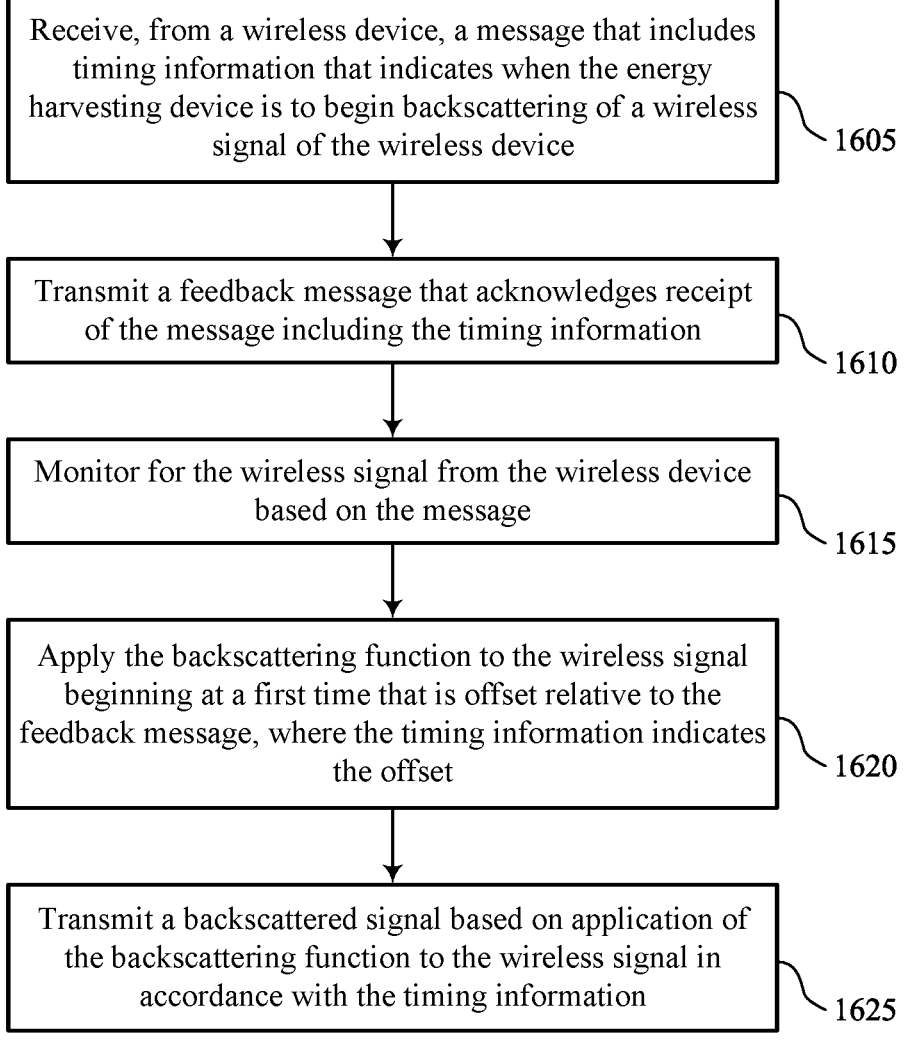

Receive, from a wireless device, a message that includes timing information that indicates when the energy harvesting device is to begin backscattering of a wireless signal of the wireless device

1605

Transmit a feedback message that acknowledges receipt of the message including the timing information

1610

Monitor for the wireless signal from the wireless device based on the message

1615

Apply the backscattering function to the wireless signal beginning at a first time that is offset relative to the feedback message, where the timing information indicates the offset

1620

Transmit a backscattered signal based on application of the backscattering function to the wireless signal in accordance with the timing information

Transmit a message that includes timing information that indicates when backscattering of a wireless signal is to begin

1705

Transmit the wireless signal based on the message

1710

Receive a backscattered signal based on a backscattering function that is applied to the wireless signal in accordance with the timing information

1715

1700

Transmit a message that indicates a timing sequence identifying when backscattering of a wireless signal is to begin 〜1805

Transmit the wireless signal based on the message 〜1810

Receive a backscattered signal based on a backscattering function that is applied to the wireless signal based on the timing sequence 〜1815

1800

TECHNIQUES FOR INDICATING BACKSCATTERING TIMING

FIELD OF TECHNOLOGY

The present disclosure relates to wireless communication, including techniques for indicating backscattering timing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, wireless devices may communicate with one another via energy harvesting and backscatter communication. A wireless device may harvest energy from received signals and may use the harvested energy to perform backscattered transmissions.

SUMMARY

The described techniques relate to improved methods, systems, devices, and apparatuses that support techniques for indicating backscattering timing. For example, the described techniques provide for a wireless device, such as a user equipment (UE), a network entity, or some other type of wireless device, to indicate timing information for backscattering a signal. The wireless device may transmit a message including the timing information that indicates when an energy harvesting device is to begin backscattering of a wireless signal. The wireless device may transmit the wireless signal after or at the same time as the message. The energy harvesting device (e.g., a radio frequency identifier (RFID) tag, a UE, or some other device) may receive the message and obtain the timing information. The energy harvesting device may monitor for the wireless signal and apply a backscattering function to the received wireless signal based on the timing information. For example, the energy harvesting device may start scrambling the wireless signal with a backscatter scrambling sequence at a time that is indicated via the timing information. The energy harvesting device may transmit a backscattered signal based on applying the backscattering function in accordance with the timing information. The wireless device may monitor for and receive the backscattered signal in accordance with the timing information, which may support improved coordination between devices and throughput of the backscattered communications.

A method for wireless communication at an energy harvesting device is described. The method may include receiving, from a wireless device, a message that includes timing information that indicates when the energy harvesting device is to begin backscattering of a wireless signal of the wireless device, monitoring for the wireless signal from the wireless device based on the message, and transmitting a backscattered signal based on application of a backscattering function to the wireless signal in accordance with the timing information.

An apparatus for wireless communication at an energy harvesting device is described. The apparatus may include a processor, memory coupled with the processor, and instructions stored in the memory. The instructions may be executable by the processor to cause the apparatus to receive, from a wireless device, a message that includes timing information that indicates when the energy harvesting device is to begin backscattering of a wireless signal of the wireless device, monitor for the wireless signal from the wireless device based on the message, and transmit a backscattered signal based on application of a backscattering function to the wireless signal in accordance with the timing information.

Another apparatus for wireless communication at an energy harvesting device is described. The apparatus may include means for receiving, from a wireless device, a message that includes timing information that indicates when the energy harvesting device is to begin backscattering of a wireless signal of the wireless device, means for monitoring for the wireless signal from the wireless device based on the message, and means for transmitting a backscattered signal based on application of a backscattering function to the wireless signal in accordance with the timing information.

A non-transitory computer-readable medium storing code for wireless communication at an energy harvesting device is described. The code may include instructions executable by a processor to receive, from a wireless device, a message that includes timing information that indicates when the energy harvesting device is to begin backscattering of a wireless signal of the wireless device, monitor for the wireless signal from the wireless device based on the message, and transmit a backscattered signal based on application of a backscattering function to the wireless signal in accordance with the timing information.

In some examples of the method, apparatuses, and non-transitory computer-readable medium described herein, receiving the message that includes the timing information may include operations, features, means, or instructions for receiving the message that indicates the timing information as a first codepoint of a set of one or more codepoints for a backscattering timer, where the backscattering function may be applied to the wireless signal after an expiration of the backscattering timer.

Some examples of the method, apparatuses, and non-transitory computer-readable medium described herein may further include operations, features, means, or instructions for receiving a timing synchronization signal for synchronizing timing between the backscattering timer and the wireless device.

In some examples of the method, apparatuses, and non-transitory computer-readable medium described herein, receiving the message that includes the timing information may include operations, features, means, or instructions for receiving the message that indicates the timing information as a first codepoint of a set of one or more codepoints, the first codepoint indicating a time offset between reception of the message and when to begin the backscattering of the wireless signal, where the backscattering function may be applied to the wireless signal based on the time offset.

In some examples of the method, apparatuses, and non-transitory computer-readable medium described herein, receiving the message that includes the timing information may include operations, features, means, or instructions for receiving the message that indicates a timing sequence identifying when the energy harvesting device may be to begin the backscattering of the wireless signal, where the backscattering function may be applied to the wireless signal based on the timing sequence.

Some examples of the method, apparatuses, and non-transitory computer-readable medium described herein may further include operations, features, means, or instructions for receiving a transmission including a delimiter indicating a start of the timing sequence, where the backscattering function may be applied to the wireless signal based on the timing sequence and the delimiter.

Some examples of the method, apparatuses, and non-transitory computer-readable medium described herein may further include operations, features, means, or instructions for applying the backscattering function to the wireless signal after detecting an end of reception of the timing sequence.

In some examples of the method, apparatuses, and non-transitory computer-readable medium described herein, receiving the message that includes the timing information may include operations, features, means, or instructions for receiving, via a field in the message, an indication of a scaling factor for scaling the timing sequence and applying the backscattering function to the wireless signal beginning at a time after the message may be received, the time determined based on a product of the scaling factor and a time duration indicated by the timing sequence.

Some examples of the method, apparatuses, and non-transitory computer-readable medium described herein may further include operations, features, means, or instructions for selecting the scaling factor from among a set of multiple scaling factors indicated via the message based on an index of the scaling factor associated with the energy harvesting device, where each scaling factor of the set of multiple scaling factors may be associated with a respective energy harvesting device of a set of multiple energy harvesting devices.

Some examples of the method, apparatuses, and non-transitory computer-readable medium described herein may further include operations, features, means, or instructions for transmitting a feedback message that acknowledges receipt of the message including the timing information.

Some examples of the method, apparatuses, and non-transitory computer-readable medium described herein may further include operations, features, means, or instructions for applying the backscattering function to the wireless signal beginning at a first time that may be offset relative to the feedback message, where the timing information indicates the offset.

In some examples of the method, apparatuses, and non-transitory computer-readable medium described herein, the offset may be relative to a beginning symbol period or an ending symbol period of the feedback message.

Some examples of the method, apparatuses, and non-transitory computer-readable medium described herein may further include operations, features, means, or instructions for receiving the wireless signal, where the wireless signal includes a reference signal or a positioning reference signal (PRS).

A method for wireless communication at an energy transferring device is described. The method may include transmitting a message that includes timing information that indicates when backscattering of a wireless signal is to begin, transmitting the wireless signal based on the message, and receiving a backscattered signal based on a backscattering function that is applied to the wireless signal in accordance with the timing information.

An apparatus for wireless communication at an energy transferring device is described. The apparatus may include a processor, memory coupled with the processor, and instructions stored in the memory. The instructions may be executable by the processor to cause the apparatus to transmit a message that includes timing information that indicates when backscattering of a wireless signal is to begin, transmit the wireless signal based on the message, and receive a backscattered signal based on a backscattering function that is applied to the wireless signal in accordance with the timing information.

Another apparatus for wireless communication at an energy transferring device is described. The apparatus may include means for transmitting a message that includes timing information that indicates when backscattering of a wireless signal is to begin, means for transmitting the wireless signal based on the message, and means for receiving a backscattered signal based on a backscattering function that is applied to the wireless signal in accordance with the timing information.

A non-transitory computer-readable medium storing code for wireless communication at an energy transferring device is described. The code may include instructions executable by a processor to transmit a message that includes timing information that indicates when backscattering of a wireless signal is to begin, transmit the wireless signal based on the message, and receive a backscattered signal based on a backscattering function that is applied to the wireless signal in accordance with the timing information.

In some examples of the method, apparatuses, and non-transitory computer-readable medium described herein, transmitting the message that includes the timing information may include operations, features, means, or instructions for transmitting the message that indicates the timing information as a first codepoint of a set of one or more codepoints for a backscattering timer, where the backscattering function may be applied to the wireless signal after an expiration of the backscattering timer.

Some examples of the method, apparatuses, and non-transitory computer-readable medium described herein may further include operations, features, means, or instructions for transmitting a timing synchronization signal for synchronizing timing between the backscattering timer and the energy transferring device.

In some examples of the method, apparatuses, and non-transitory computer-readable medium described herein, transmitting the message that includes the timing information may include operations, features, means, or instructions for transmitting the message that indicates the timing information as a first codepoint of a set of one or more codepoints, the first codepoint indicating a time offset between reception of the message and when to begin the backscattering of the wireless signal, where the backscattering function may be applied to the wireless signal based on the time offset.

In some examples of the method, apparatuses, and non-transitory computer-readable medium described herein, transmitting the message that includes the timing information may include operations, features, means, or instructions for transmitting the message that indicates a timing sequence identifying when the backscattering of the wireless signal may be to begin, where the backscattering function may be applied to the wireless signal based on the timing sequence.

Some examples of the method, apparatuses, and non-transitory computer-readable medium described herein may further include operations, features, means, or instructions for transmitting a transmission including a delimiter indicating a start of the timing sequence, where the backscattering function may be applied to the wireless signal based on the timing sequence and the delimiter.

In some examples of the method, apparatuses, and non-transitory computer-readable medium described herein, transmitting the message that includes the timing information may include operations, features, means, or instructions for transmitting, via a field in the message, an indication of a scaling factor for scaling the timing sequence, where the backscattering function may be applied to the wireless signal beginning at a second time after the message may be received, the second time determined based on a product of the scaling factor and a time duration indicated by the timing sequence.

In some examples of the method, apparatuses, and non-transitory computer-readable medium described herein, transmitting the message that includes the timing information may include operations, features, means, or instructions for transmitting, via one or more fields in the message, an indication of a set of multiple scaling factors for scaling the timing sequence, where each scaling factor of the set of multiple scaling factors may be associated with a respective energy harvesting device of a set of multiple energy harvesting devices.

Some examples of the method, apparatuses, and non-transitory computer-readable medium described herein may further include operations, features, means, or instructions for receiving a set of multiple backscattered signals including the backscattered signal, where each backscattered signal of the set of multiple backscattered signals may be received from a respective energy harvesting device of the set of multiple energy harvesting devices at a respective time after the message may be transmitted, the respective time based on a scaling factor of the set of multiple scaling factors that may be associated with the respective energy harvesting device.

Some examples of the method, apparatuses, and non-transitory computer-readable medium described herein may further include operations, features, means, or instructions for receiving a feedback message that acknowledges receipt of the message including the timing information, where the backscattering function may be applied to the wireless signal beginning at a first time that may be offset relative to the feedback message, where the timing information indicates the offset.

In some examples of the method, apparatuses, and non-transitory computer-readable medium described herein, where the offset may be relative to a beginning symbol period or an ending symbol period of the feedback message.

Some examples of the method, apparatuses, and non-transitory computer-readable medium described herein may further include operations, features, means, or instructions for determining a position of an energy harvesting device based on receiving the backscattered signal, where the wireless signal includes a reference signal or a PRS.

BRIEF DESCRIPTION OF THE DRAWINGS

FIGS. 14 through 19 illustrate flowcharts showing methods that support techniques for indicating backscattering timing in accordance with one or more aspects of the present disclosure.

DETAILED DESCRIPTION

Figure 1:
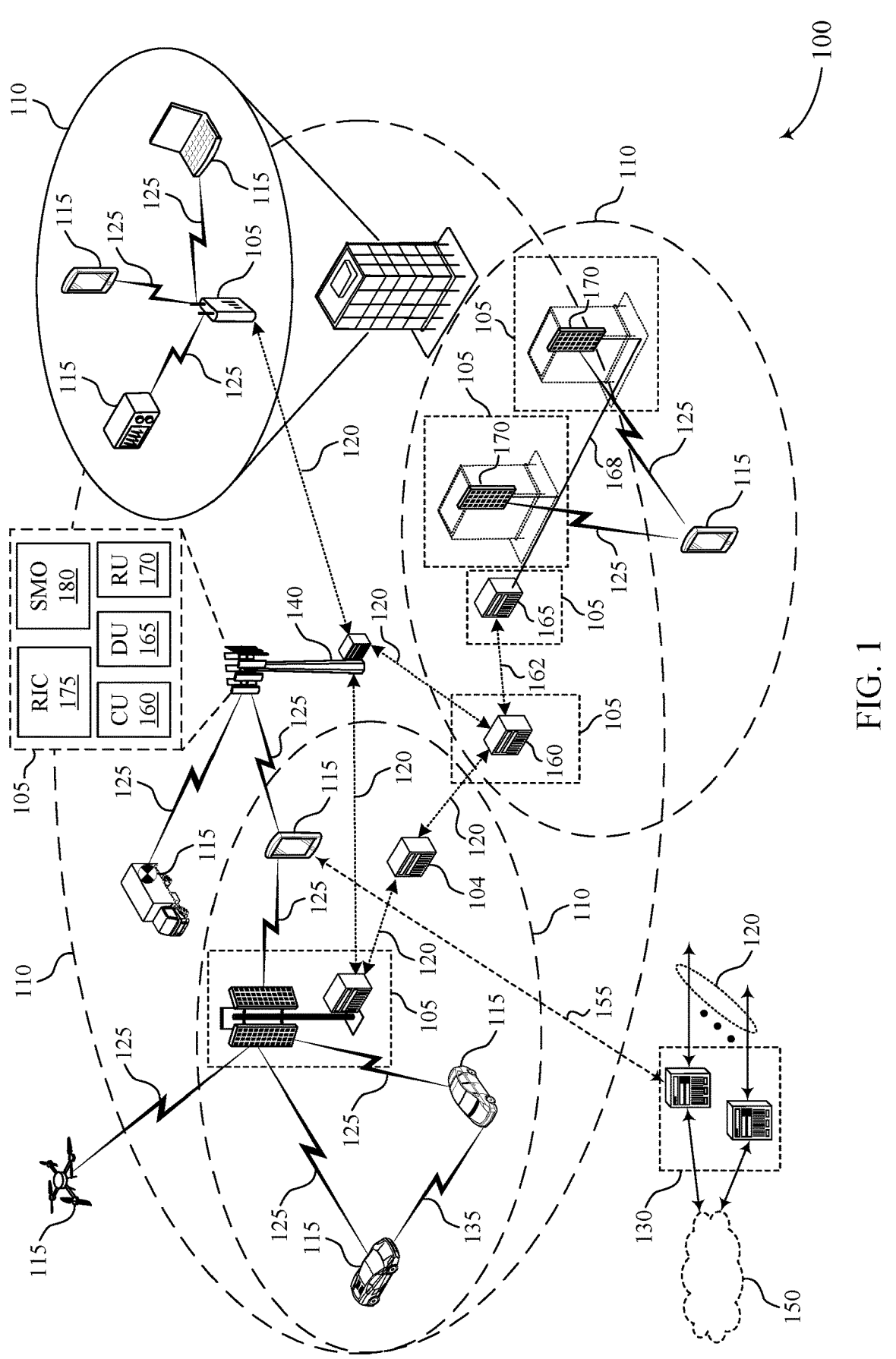
FIG. 1 illustrates an example of a wireless communications system that supports techniques for indicating backscattering timing in accordance with one or more aspects of the present disclosure.

In some wireless communication systems, a wireless device (e.g., a user equipment (UE) or a network node) may communicate with one or more low power devices or other devices that support energy harvesting (e.g., one or more radio frequency identification (RFID) tags, which may also be referred to as UEs, in some examples). To perform energy harvesting, a wireless device may harvest energy from the environment and received signals to perform transmissions. Such a device may be referred to as an energy harvesting device herein. The transmissions by the energy harvesting device may be backscatter modulated. For example, the energy harvesting device may receive a signal, may apply a backscattering function to the received signal, and may transmit a backscattered signal using energy harvested from over the air. The wireless device may facilitate the energy harvesting by transmitting a wireless signal and receiving the backscattered signal, and may be referred to as an energy transfer device herein. In some examples, the energy transfer device may determine a location of the energy harvesting device based on the backscattered signal. However, the energy transfer device may not know when the energy harvesting device will start to backscatter the signal, and the energy transfer device may monitor multiple different timing hypothesis to accurately receive the reflected signal, which may increase complexity and reduce reliability.

Techniques, systems, and devices described herein provide for an energy transfer device to indicate a time at which an energy harvesting device is to begin backscattering a wireless signal. The energy transfer device may transmit backscatter timing information to the energy harvesting device via a signaling message transmitted before or at the same time as the wireless signal. The energy transfer device may transmit the wireless signal, which may be, for example, a continuous waveform signal, a positioning reference signal (PRS), a reference signal, or some other type of signal. The energy harvesting device may receive the wireless signal and may apply a backscattering function to the received wireless signal at a time that is indicated by the backscatter timing information. The energy harvesting device may transmit the backscattered signal after or concurrently with applying the backscattering function at the indicated time. The energy transfer device may be able to accurately monitor for and receive the backscattered signal based on the timing information, which may reduce processing complexity and improve throughput, among other advantages.

In some examples, the timing information may be transmitted via one or more codepoints in the signaling message. The one or more codepoints may indicate a timer or a time period within which backscattering is to be applied. Additionally, or alternatively, the timing information may be conveyed via a timing sequence (e.g., a sequence of signals) appended to the signaling message. For example, the end of the timing sequence may indicate a time at which backscattering is to be applied. In some examples, one or more codepoints or fields in the signaling message may indicate a scaling factor for scaling the timing sequence. In such cases, the energy harvesting device may apply backscattering after a time period that is based on a product of the timing sequence and the scaling factor. The energy harvesting device may, in some cases, transmit feedback to acknowledge receipt of the timing information. In such cases, the backscatter timing may be based on a timing of the feedback transmission.

Aspects of the disclosure are initially described in the context of wireless communication systems. Additionally aspects of the disclosure are described with reference to backscatter timing diagrams and process flows. Aspects of the disclosure are further illustrated by and described with reference to apparatus diagrams, system diagrams, and flowcharts that relate to techniques for indicating backscattering timing.

FIG. 1 illustrates an example of a wireless communications system 100 that supports techniques for indicating backscattering timing in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communication systems (e.g., wireless communication system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for indicating backscattering timing as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023). Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communication systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communication system 100 may support RFID technologies. RFID technology may be utilized for inventory and asset management, IoT, sustainable sensor networks in factories and/or agriculture, and smart home scenarios, among other example use cases. RFID may include relatively small transponders, or tags (e.g., microchips), that may emit an information-bearing signal upon receiving a signal. RFID may be operated with or without a batter at the RFID device and with relatively low operating cost (OPEX), relatively low maintenance cost, and a relatively long life circle.

In some implementations, the wireless communications system 100 may include one or more passive devices. Passive devices may include, but are not limited to, RFID tags, passive IoT devices, hybrid devices including passive and active components, passive components of otherwise active/querying devices (e.g., passive components of a UE 115), or any combination thereof. For example, in some implementations, a UE 115 of the wireless communications system 100 may serve as a passive device. A passive RFID may harvest energy over the air and may power transmission and reception circuitry at the device using the harvested energy. The transmitted signal by the passive RFID may be backscatter modulated. In some examples, the wireless communications system 100 may include one or more semi-passive or active RFID devices, which may include a battery, but may be more costly than passive devices.

Passive IoT may be supported for different types of wireless communications (e.g., different industrial verticals, including URLLC, MTC, and other use cases). However, some systems may not efficiently support RFID-type sensors, including passive IoT devices for use cases including asset management, logistics, warehousing, and manufacturing, among other examples. Techniques for managing and communicating with passive IoT devices may be beneficial. For example, a network entity 105 may read or write information stored on a passive IoT device, may provide energy to the passive IoT device, may receive a reflected information bearing signal, and may decode information transmitted by passive IoT devices by reading the reflected signal.

In some examples, one or more devices in the wireless communications system 100, such as a UE 115, a network entity 105, or other devices, may utilize one or more positioning algorithms to detect a position of a passive IoT device. The passive IoT device may, in some examples, perform a calculation to assist with the positioning, or the passive IoT device may actively transmit some signaling or measurement results to assist the other device with positioning functionality. Such techniques may be associated with relatively high power consumption.

Techniques described herein provide for passive IoT positioning with relatively low power consumption. A relatively low cost tag (e.g., an RFID tag, or some other type of tag) may support positioning without performing active transmission and without performing extensive computation or measurement. For example, the tag, which may be referred to as an energy harvesting device in some examples, may support radio frequency power harvesting. The energy harvesting device may receive an energy transfer signal with a given downlink power, and the energy harvesting device may include one or more components configured to harvest the downlink power from the received signal and use the harvested power to generate and transmit another signal, which may be referred to as a reflected or backscattered signal. A device that transmits the energy transfer signal may be referred to as an energy transfer device in some aspects described herein. Such energy harvesting may support reduced power positioning techniques.

An energy transfer device in the wireless communications system (e.g., a reader, such as a UE 115, a network entity 105, or some other type of device) may transmit a signal to locate the relatively low cost tag or energy harvesting device. The energy harvesting device may harvest power from the signal (e.g., a PRS or some other type of signal) and may use the harvested energy to transmit a reflected signal. The energy harvesting device may backscatter modulate the signal. The energy transfer device may use the reflected or backscattered signal to perform positioning. In some examples, to improve range of the described signaling, the energy harvesting device may include a relatively low capacity battery or capacitor, which may reduce a threshold downlink power level of the energy transfer signal for activating the circuit at the tag.

Techniques, systems, and devices described herein provide for an energy transfer device, such as a UE 115, a network entity 105, or some other type of wireless device, to indicate timing information for backscattering a signal. The energy transfer device may transmit a message including the timing information that indicates when an energy harvesting device is to begin backscattering of a wireless signal. The energy transfer device may transmit the wireless signal after or at the same time as the message. The energy harvesting device (e.g., an RFID tag, a UE 115, or some other device) may receive the message and obtain the timing information. The energy harvesting device may monitor for the wireless signal and apply a backscattering function to the received wireless signal based on the timing information. For example, the energy harvesting device may start scrambling the wireless signal with a backscatter scrambling sequence at a time that is indicated via the timing information. The energy harvesting device may transmit a backscattered signal based on applying the backscattering function in accordance with the timing information. The energy transfer device may monitor for and receive the backscattered signal in accordance with the timing information, which may support improved coordination between devices and throughput of the backscattered communications.

Figure 2:
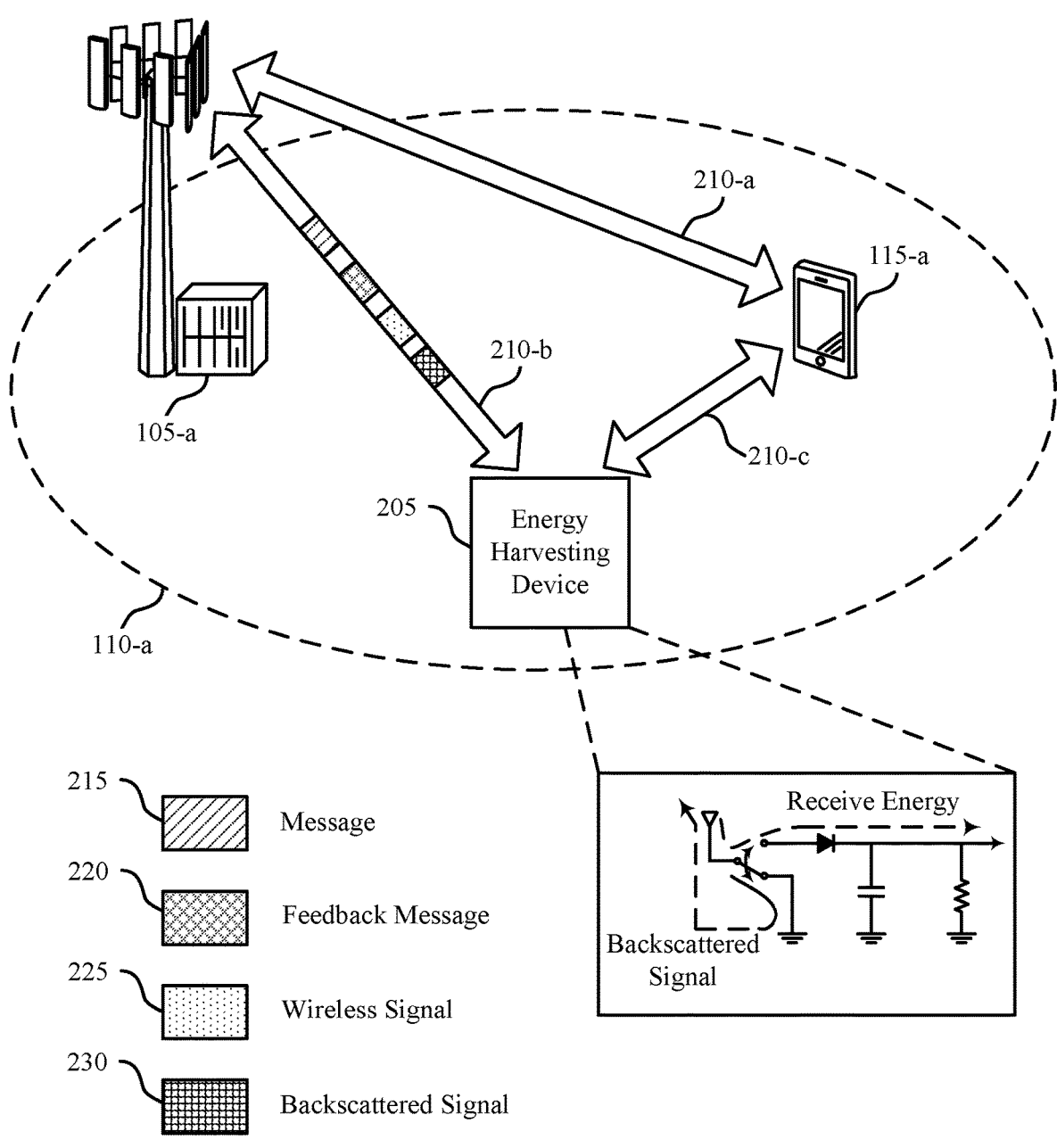
FIG. 2 illustrates an example of a wireless communications system that supports techniques for indicating backscattering timing in accordance with one or more aspects of the present disclosure.

FIG. 2 illustrates an example of a wireless communication system 200 that supports techniques for indicating backscattering timing in accordance with one or more aspects of the present disclosure. The wireless communication system 200 may implement or be implemented by aspects of the wireless communication system 100. For example, the wireless communication system 200 illustrates a network entity 105-a and a UE 115-a, which may represent examples of corresponding devices as described with reference to FIG. 1. The network entity 105-a and the UE 115-a may communicate within a geographic coverage area 110-a and via a communication link 210-a. In some examples, the network entity 105-a, the UE 115-a, or both may communicate with an energy harvesting device 205 via communication links 210-b and 210-c, respectively. As described herein, the devices may exchange signaling that indicates timing information for backscattering a wireless signal 225.

The energy harvesting device 205 may be a UE 115, a network entity 105, a RFID tag, an IoT device, or any other type of wireless device. As described with reference to FIG. 1, the energy harvesting device 205 may harvest energy from a received signal and may use the harvested energy to transmit or backscatter a signal. In some examples, the energy harvesting device 205 may harvest energy from the same signal that the energy harvesting device 205 backscatters. Additionally, or alternatively, the energy harvesting device 205 may harvest energy from a first signal and may receive a second signal that the energy harvesting device 205 backscatters using the harvested energy. The signal may be referred to as a wireless signal 225 or, in some examples, an energy transfer signal, and may represent an example of a continuous waveform signal, a reference signal, or some other type of signal or message. The energy harvesting device 205 may receive a wireless signal 225 from the network entity 105-a, the UE 115-a, one or more other wireless devices, or any combination thereof. That is, the described techniques for energy harvesting and backscattering may be performed by any type of wireless device described herein. A device that transmits the wireless signal 225 may be referred to as an energy transfer device, in some examples.

In some examples, the wireless devices of the wireless communication system 200 (e.g., the network entity 105-a, the UE 115-a, and the energy harvesting device 205) may communicate with one another via energy harvesting and backscatter communication. The terms "forward communication" and "backscatter communication" may refer to a relative direction of communication between an energy transfer device and an energy harvesting device 205. For example, in the context of backscatter communication, the UE 115-a (e.g., an energy transfer device) may transmit a signal or query to the energy harvesting device 205 via a forward link of a communication link 210-c, and the energy harvesting device 205 may transmit a backscattered message via a backscatter link of the communication link 210-c. The network entity 105-a may similarly support energy harvesting and backscatter communication with the energy harvesting device 205 via the communication link 210-b.

For the purposes of the present disclosure, the term "energy transfer device," and like terms, may be used interchangeably to refer to wireless devices that are configured to transmit commands or queries (e.g., wireless signals, energy transfer signals) to passive devices or other devices that are configured to perform energy harvesting, such as the energy harvesting device 205. Moreover, the term "energy transfer device," and like terms, may broadly be used to refer to wireless devices which transmit and/or receive signals from energy harvesting devices 205, and may therefore include "RF sources" and "Readers," or both. In this regard, energy transfer devices may include UEs 115, network entities 105, IAB nodes, and the like.

As noted previously herein, in some implementations, an energy harvesting device may be a relatively low-complexity device which may or may not include a power amplifier and/or a battery. In some cases, an energy harvesting device 205 may include one or more antennas (e.g., dipole antennas) and other circuitry (e.g., integrated circuit, chip, load) used to facilitate wireless communications. In some aspects, the range over which an energy harvesting device 205 can transmit a message (e.g., a backscattered signal 230) may depend on the manner in which the respective energy harvesting device 205 is powered. For example, in some cases, an energy harvesting device 205 may not include a power source, but may instead receive power from wireless communications received from energy transfer devices and may transmit far-field signals or modulate reflected signals using power absorbed or extracted from signals received from energy transfer devices. In such cases, the range of such energy harvesting device 205 may be relatively small.

In some aspects, an energy harvesting device 205 may receive or generate power (e.g., radio frequency power harvesting) used for wireless communications and other operations using a rectifier, where a rectifier may include a diode and a capacitor. For example, an energy harvesting device 205 may receive a signal from an energy transfer device (e.g., the UE 115-a or the network entity 105-a) via an antenna, where power absorbed from the antenna is directed to a power rectifier. In this example, the power rectifier may convert absorbed power from the antenna to rectified power, which may be directed back to the antenna to transmit messages (e.g., transmit backscattered signals 230). The input power may be nonlinear at power headroom, in some examples, due to one or more diodes. In some examples, the input power absorbed from the antenna may be greater than a threshold power (e.g., −20 decibel milliwatts (dBm), or some other threshold) to turn on the power harvesting circuitry at the energy harvesting device 205 (e.g., due to a turn-on voltage of one or more diodes). The power harvesting may, in some examples, be more efficient at lower frequencies based on diode junction capacitance and resistance (e.g., frequency-selective conversion efficiency).

After transmitting a wireless signal 225 to the energy harvesting device 205, an energy transfer device, such as the network entity 105-a, may monitor for a backscattered signal 230 from the energy harvesting device 205. In some examples, a time at which the energy harvesting device 205 initiates a backscattering operation may not be aligned with a transmission and reception time of the wireless signal 225. For example, the backscatter operation may be initiated after the wireless signal 225 is received, or the backscatter operation may be initiated before the wireless signal 225 is received, as illustrated and described in further detail with reference to FIGS. 3A and 3B, respectively. The backscattering operation may include applying a backscatter scrambling sequence to the received wireless signal 225 and backscattering the modulated signal. If the backscatter timing is not aligned with the wireless signal 225 timing, the energy transfer device may not know when to detect the backscattered signal 230, or the backscatter scrambling operation may not be applied to all of the received signal, or both, which may increase processing complexity and latency.

Techniques, systems, and devices described herein provide for an energy transfer device to transmit a message 215 that includes timing information that indicates a time at which the energy harvesting device 205 is to start backscattering a wireless signal 225. The message 215 may be transmitted prior to or at the same time as a wireless signal 225. The message 215 may include the timing information and address information associated with the wireless signal 225. The address information may indicate an identifier (ID) of the energy harvesting device 205, an ID of the energy transfer device, or both (e.g., a tag ID and/or Reader ID). The energy harvesting device 205 may receive the message 215 and obtain the timing information.

In some examples, the timing information may include one or more codepoints that indicate an offset or a timer for when to apply backscattering. Additionally, or alternatively, the timing information may include a timing sequence that indicates when the energy harvesting device 205 is to apply backscattering. In some examples, an energy transfer device, such as the network entity 105-a, may transmit the message 215 to multiple energy harvesting devices 205 (e.g., users), and may support time division duplexing of backscattered signals 230 from the multiple energy harvesting devices 205. The message 215 may include, for example, multiple fields or scaling factors each associated with backscatter timing for a respective energy harvesting device 205 of the multiple energy harvesting devices 205. Techniques for indicating backscattering timing are described in further detail elsewhere herein, including with reference to FIGS. 5 and 6.

In some examples, the energy harvesting device 205 may transmit a feedback message 220 to the network entity 105-a in response to or after reception of the message 215 including the backscatter timing information. The feedback message 220 may include an acknowledgment (ACK) or negative ACK (NACK) based on whether the energy harvesting device 205 accurately received and decoded the backscatter timing information. In such cases, the timing information indicated via the message 215 may account for feedback timing. For example, if the energy harvesting device 205 transmits an ACK via the feedback message 220, the timing information may indicate that the energy harvesting device 205 is to start backscattering at a given time after the feedback message 220 is transmitted, as described in further detail elsewhere herein, including with reference to FIG. 7.

The described techniques may thereby support signaling for indicating backscatter timing, which may improve coordination between devices in the wireless communication system 200, may improve throughput and reliability of communications, and may reduce processing complexity and power consumption.

Figure 3A:
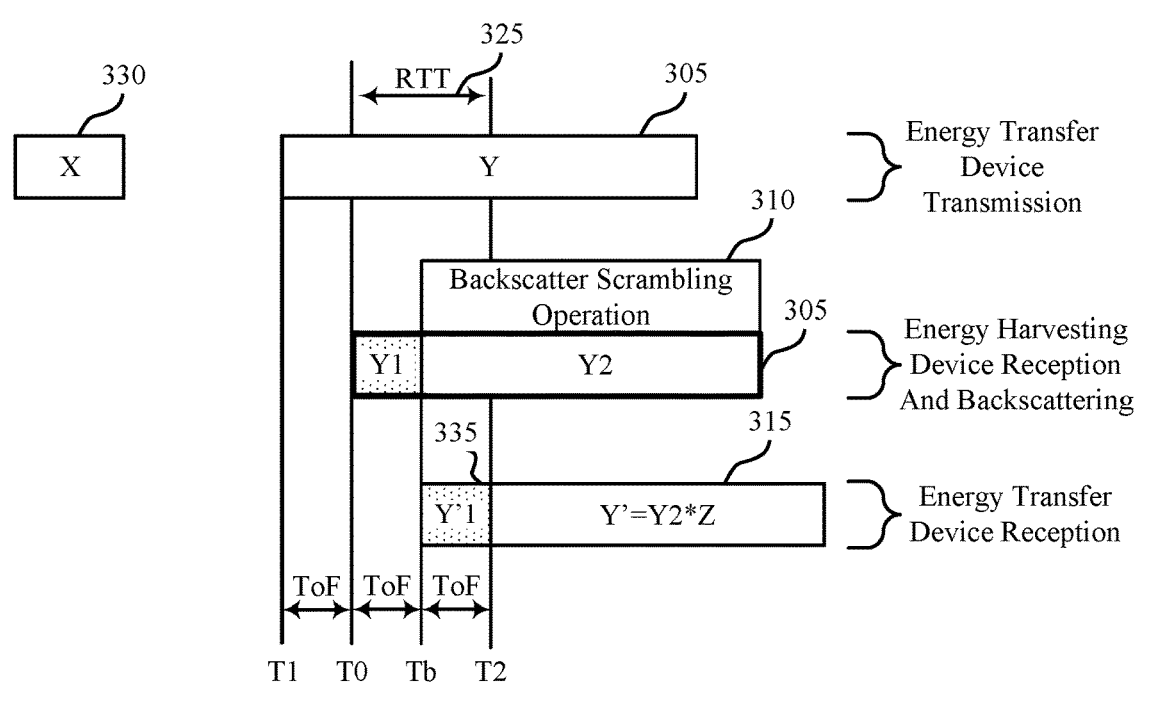
FIGS. 3A and 3B illustrate examples of backscatter timing diagrams that support techniques for indicating backscattering timing in accordance with one or more aspects of the present disclosure.
Figure 3B:
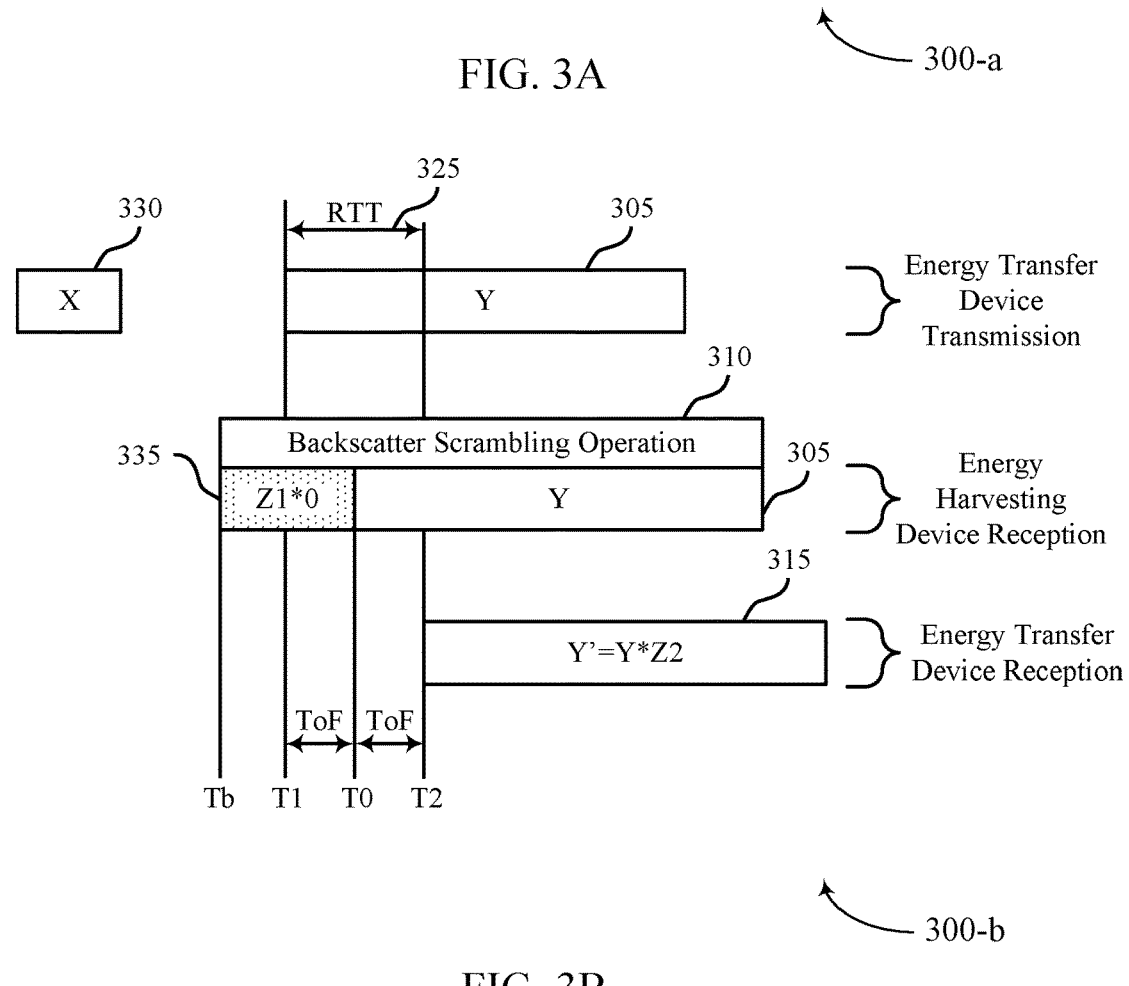

FIGS. 3A and 3B illustrate examples of backscatter timing diagrams 300-a and 300-b that support techniques for indicating backscattering timing in accordance with one or more aspects of the present disclosure. The backscatter timing diagrams 300-*a* and 300-*b* may implement or be implemented by aspects of the wireless communication systems 100 and 200 as described with reference to FIGS. 1 and 2. For example, the backscatter timing diagrams 300-*a* and 300-*b* illustrate timelines over which an energy harvesting device may receive a reference signal 305, apply a backscatter scrambling operation 310, and transmit the backscattered signal back to the energy transferring device. The backscatter timing diagrams 300-*a* and 300-*b* illustrate timing of signaling transmitted by the energy transfer device (labeled Energy Transfer Device Transmission), timing of the signaling as it is received by the energy harvesting device (labeled Energy Harvesting Device Reception), and timing of the reflected or backscattered signaling as it is subsequently received by the energy transfer device (labeled Energy Transfer Device Reception). The energy harvesting device and the energy transferring device may represent examples of corresponding devices as described with reference to FIGS. 1 and 2.

The energy transfer device (also referred to as a reader in some examples herein) may, in some examples, transmit an initial signaling message 330 (e.g., X). The signaling message 330 may include address information associated with the energy transfer device, one or more parameters associated with the energy harvesting device (e.g., an ID of the energy harvesting device), one or more backscattering parameters, or any combination thereof. The energy harvesting device may receive the signaling message 330 and obtain the parameters.

The energy transfer device may subsequently transmit a reference signal 305 for positioning or ranging (e.g., a PRS or some other type of reference signal). The reference signal 305 (e.g., Y) may be referred to as an energy transfer signal or a wireless signal in some aspects herein, such as the wireless signal 225 described with reference to FIG. 2. The energy harvesting device may receive the reference signal 305 and may reflect the reference signal 305 back to the energy transfer device. The energy harvesting device may apply a backscatter scrambling operation 310 to the reference signal 305 before, after, or at the same time as reflecting the reference signal 305. The energy harvesting device may utilize energy conveyed via the reference signal 305 to perform the transmission (or reflection) of the backscattered signal 315, as described in further detail elsewhere herein, including with reference to FIG. 2.

FIG. 3A illustrates a first backscatter timing diagram 300-*a*. In this example, the energy harvesting device may start the backscatter scrambling operation 310 at a time Tb that is later than a time T0 at which the reference signal 305 (e.g., Y) is received.

The energy transfer device may transmit the reference signal 305 (e.g., Y), which may be a PRS, or some other type of reference signal, starting at a first time T1 after transmission of the signaling message 330. The energy harvesting device may receive the reference signal 305 at a second time T0. The second time T0 may be delayed from the first time T1 based on a time of flight (ToF) of the reference signal 305 over the air (e.g., T0−T1=ToF). The reference signal 305 transmitted by the energy transferring device may be received by the energy harvesting device at a known time instant T0, and may be represented by Y(t−T0), where t represents a current time.

In some examples, the energy harvesting device may start reflecting the reference signal 305 at the time T0 when the energy harvesting device receives the reference signal 305.

As such, a first portion (Y1) of the reference signal 305 may be backscattered or reflected by the energy harvesting device before the backscatter scrambling operation 310 is initiated. The energy transferring device may receive the first backscattered portion 335 (e.g., Y'1) at a time Tb after the energy harvesting device starts reflecting the first portion based on a ToF of the signal over the air.

In the example illustrated in FIG. 3A, the energy harvesting device may initiate the backscatter scrambling operation 310 at a time Tb that is after the second time T0 at which the reference signal 305 is received at the energy harvesting device (e.g., Tb−T0>0). The time Tb may be randomly selected by the energy harvesting device, may be based on one or more processing delay periods at the energy harvesting device, may be based on a lack of synchronization between the energy harvesting device and the energy transferring device, or any combination thereof. Performing the backscatter scrambling operation 310 may include applying, by the energy harvesting device, a backscatter scrambling sequence to the reference signal 305. Accordingly, in the example of FIG. 3A, the backscatter scrambling sequence may not be applied to the first portion of the reference signal 305. For example, the reference signal 305 may include a first portion Y1 and a second portion Y2, and the first portion Y1 may not be scrambled using the backscatter scrambling sequence due to the delayed backscatter timing. The second portion Y2 may be scrambled based on the backscatter scrambling operation 310 being performed during the second portion Y2.

The energy harvesting device may start transmitting a backscattered signal 315 (e.g., Y') at the same time Tb that the energy harvesting device starts the backscatter scrambling operation 310. Transmitting the backscattered signal may include backscattering or reflecting the reference signal based on the backscatter scrambling operation 310 and, in some examples, the information indicated via the signaling message 330.

The backscattered signal 315 may be received by the energy transfer device at a third time T2 based on a ToF of the backscattered signal 315 (e.g., T2−Tb=ToF). The backscattered signal 315 may be equal to a product of the second portion of the reference signal 305 and the scrambling sequence (e.g., Y'=Y2*Z, where Z represents the scrambling sequence). The energy transferring device may perform a full duplex operation to support transmission of the reference signal 305 while monitoring for and receiving the backscattered signal 315. A function applied by the energy transferring device to detect the backscattered signal 315 may be based on a difference between the second time T0 at which the energy transferring device transmits the reference signal 305 and the time Tb at which the energy harvesting device initiates the backscatter scrambling operation 310.

In some examples, the energy transfer device may utilize one or more timing hypotheses to predict when to monitor for and detect the backscattered signal 315 (e.g., to predict the time Tb). The energy transfer device may receive the backscattered signal 315 using the timing hypothesis and may estimate a round-trip-time (RTT) 325 of the reference signal 305 and backscattered signal 315 based on the detected backscattered signal 315. The energy transfer device may use the RTT 325 to infer ranging and positioning information associated with the energy harvesting device. Thus, if the backscattering timing is later than the transmission time of the reference signal 305, the energy harvesting device may not apply scrambling on a first portion 335 of the reference signal 305 and the energy transferring device may utilize multiple timing hypotheses to estimate when to detect the backscattered signal 315, which may increase processing complexity and latency.

FIG. 3B illustrates a second backscatter timing diagram 300-b. In this example, the energy harvesting device may start the backscatter scrambling operation 310 at a time Tb that is earlier than a transmission time T0 of the reference signal 305 (e.g., Y).

The energy transferring device may transmit a reference signal 305 (e.g., Y), which may be a PRS, or some other type of reference signal starting at a first time T1 after transmitting the signaling message 330. The energy harvesting device may receive the reference signal 305 at a second time T0. The second time T0 may be a known time instant and may be delayed from the first time T1 based on a ToF of the reference signal 305 over the air (e.g., T0–T1=ToF).

In this example, the energy harvesting device may start applying a backscatter scrambling operation 310 at a time Tb that is earlier than the transmission time of the reference signal 305. For example, the time Tb may be before the known time instant T0, before the time instant T1, or both (e.g., Tb–T0<0). The time Tb may be randomly selected by the energy harvesting device, may be based on one or more processing delay periods at the energy harvesting device, may be based on a lack of synchronization between the energy harvesting device and the energy transferring device, or any combination thereof. Performing the backscatter scrambling operation 310 may include applying, by the energy harvesting device, a backscatter scrambling sequence to a received signal.

Accordingly, in the example of FIG. 3B, the energy harvesting device may start backscatter scrambling on a noise input (e.g., the device may scramble noise or other interference received before the reference signal 305). Thus, the backscatter scrambling may be represented by $Z1*0$ for the first portion 335, where $Z1$ represents a first portion of the backscatter scrambling sequence, which is multiplied by zero or a near-zero value to represent an absence of signaling received from the energy transfer device during the first portion 335 (e.g., the time period between Tb and T0). The reference signal 305 (e.g., Y) may be scrambled, as part of the backscatter scrambling operation 310, with a later version or portion of the scrambling sequence.

The energy harvesting device may start reflecting or backscattering the reference signal 305 at the time T0 that the reference signal 305 is received. The backscattered signal 315 may be received at the energy transfer device at a time T2 that is delayed from the time T0 by a ToF (e.g., T2–T0=ToF). The backscattered signal 315 (e.g., Y') may be based on a product of the reference signal 305 (e.g., Y) and a second portion of the backscatter scrambling sequence (e.g., $Y'=Y*Z2$, where $Z2$ represents the second portion of the backscatter scrambling sequence that is after the first portion $Z1$ of the backscatter scrambling sequence and starts at the time Tb).

The energy transferring device may perform a full duplex operation to support transmission of the reference signal 305 while monitoring for and receiving the backscattered signal 315. A function applied by the energy transferring device to detect the backscattered signal 315 may be based on a difference between the second time T0 at which the energy transferring device transmits the reference signal 305 and the time Tb at which the energy harvesting device initiates the backscatter scrambling operation 310.

In some examples, the energy transfer device may utilize one or more timing hypotheses to predict when to monitor for and detect the backscattered signal 315. In this example, the timing hypotheses may be multiple Z2 hypothesis (e.g., predictions or estimates for when the second portion Z2 of the scrambling sequence may begin). The energy transfer device may receive the backscattered signal 315 based on using the timing hypotheses, and may estimate an RTT 325 of the reference signal 305 and backscattered signal 315 based on the detected backscattered signal 315. The energy transfer device may use the RTT 325 to infer ranging and positioning information associated with the energy harvesting device. Thus, if the backscattering timing is earlier than the transmission time of the reference signal 305, the energy harvesting device may scramble the reference signal 305 with a later portion of a scrambling sequence and the energy transferring device may utilize multiple timing hypotheses to estimate when to detect the backscattered signal 315, which may increase processing complexity and latency.

As such, detection by the energy transfer device of a backscattered signal 315 may be different based on a relationship between backscattering timing at the energy harvesting device (e.g., Tb) and the timing of transmission of the reference signal 305 (e.g., T0). The reference signal 305 transmitted by the energy transfer device at a known time instant T0 may be represented by $Y(t–T0)$ and the backscatter scrambling sequence may be represented by $Z(t–Tb)$. Thus, the energy transfer device may attempt to detect the backscattered signal 315, which may be represented by $Y(t–T0)*Z(t–Tb)$. A preferred (e.g., optimal) detection algorithm used by the energy transfer device may be different based on whether Tb–T0 is zero, positive, or negative. The described backscatter communications may be associated with an increased throughput and reduced complexity if backscatter timing is aligned with the timing of the reference signal 305, as illustrated and described in further detail with reference to FIG. 4.

Techniques described herein provide for the energy transfer device to indicate, to the energy harvesting device via the signaling message 330, backscatter timing information that indicates when the energy harvesting device is to apply backscattering (e.g., to indicate the time Tb). The backscatter timing information may provide for the backscatter timing to be aligned with the reference signal timing, which may improve coordination between devices, improve the backscatter scrambling operation 310, and provide for the energy transfer device to reduce usage of timing hypotheses, which may reduce latency and processing complexity. Techniques for indicating backscatter timing are described in further detail elsewhere herein, including with reference to FIGS. 4-8.

Figure 4:
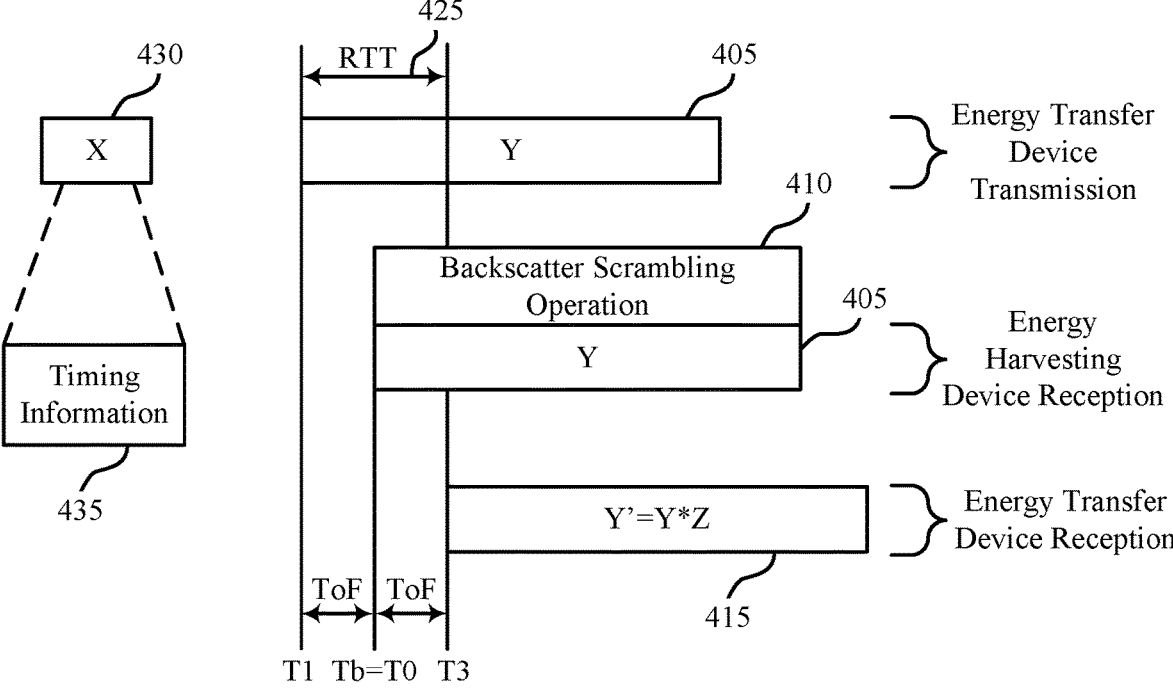
FIG. 4 illustrates an example of a backscatter timing diagram that supports techniques for indicating backscattering timing in accordance with one or more aspects of the present disclosure.

FIG. 4 illustrates an example of a backscatter timing diagram 400 that supports techniques for indicating backscattering timing in accordance with one or more aspects of the present disclosure. The backscatter timing diagram 400 may implement or be implemented by aspects of the wireless communication systems 100 and 200 or the backscatter timing diagram 300 as described with reference to FIGS. 1-3. For example, the backscatter timing diagram 400 illustrate a timeline over which an energy harvesting device may receive a reference signal 405, apply a backscatter scrambling operation 410, and transmit the backscattered signal 415 back to the energy transferring device. The backscatter timing diagram 400 may illustrate timing of signaling transmitted by the energy transfer device (labeled Energy Transfer Device Transmission), timing of the signaling as it is received by the energy harvesting device (labeled Energy Harvesting Device Reception), and timing of the reflected or backscattered signaling as it is subsequently received by the energy transfer device (labeled Energy Transfer Device Reception). The energy harvesting device and the energy transferring device may represent examples of corresponding devices as described with reference to FIGS. 1-3. In this example, a timing of the backscatter scrambling operation 410 may be aligned with the reference signal 405 based on timing information 435 indicated via a signaling message 430.

In the example illustrated in FIG. 4, the energy transfer device may transmit the reference signal 405 (e.g., Y) at a first time T1, and the energy harvesting device may receive the reference signal 405 at a second time T0. The second time may be delayed from the first time based on a ToF of the signal over the air (e.g., T0–T1–ToF). The energy harvesting device may start the backscatter scrambling operation 410 at the same time as (or approximately the same time as) the energy harvesting device receives the reference signal 405 (e.g., Tb–T0=0). That is, the backscatter timing may be aligned with the transmission time of the reference signal 405. The backscatter timing may be considered aligned with the reference signal 405 if a timing error between the start of the backscatter scrambling operation 410 is within a threshold time period of the transmission timing of the reference signal 405 (e.g., within a few chips of Y).

The energy harvesting device may apply a backscatter scrambling sequence to the reference signal 405 starting at the time Tb based on the backscatter scrambling operation 410. The energy harvesting device may transmit the backscattered signal 415 to the energy transfer device. The backscattered signal 415 may be equal to a product of the reference signal and the backscatter scrambling sequence (e.g., Y'=Y*Z, where Z represents the backscatter scrambling sequence).

The energy transfer device may receive the backscattered signal 415 at a time T3, which may be delayed from the time Tb based on a ToF of the signal over the air (e.g., T3–Tb=ToF). When the backscatter timing is aligned with the transmission timing, as illustrated in FIG. 4, the energy transfer device may know when to monitor for the backscattered signal 415. Thus, the energy transfer device may refrain from using timing hypotheses, which may reduce processing complexity and latency as compared with scenarios in which the backscattering timing is not aligned with the transmission timing, such as the examples illustrated in FIGS. 3A and 3B.

Techniques, systems, and devices described herein provide for an indication of timing information 435 for backscattering, which may support alignment between the backscatter timing and the transmission timing, as well as improved coordination between devices. As described herein, the energy transfer device may transmit a signaling message 430 that includes timing and addressing information. In addition to or as an alternative to indicating addressing information, such as an ID of the energy transfer device or an ID of the energy harvesting device, the energy transfer device may indicate, via the signaling message 430 or some other message, timing information 435 that indicates when the energy harvesting device is to begin backscattering the reference signal 305 (e.g., a wireless signal). That is, the timing information 435 may indicate the time Tb to the energy harvesting device. The energy harvesting device may detect the signaling message 430 and may recover the backscatter timing Tb from the timing information 435. The energy transfer device may apply a different detection algorithm depending on the backscatter timing indicated via the timing information 435, such that the devices may be aligned in their timing, which may reduce processing complexity and improve communication reliability and throughput.

In the example illustrated in FIG. 4, the energy harvesting device may perform backscatter transmission at time Tb based on the timing information 435 indicated via the signaling message 430 (e.g., the timing information 435 may indicate Tb). The energy transfer device may detect the backscattered signal 415 based on the timing information 435 and may estimate an RTT 425 of the reference signal 405 and the backscattered signal 415. The energy transfer device may use the RTT 425 to infer ranging and positioning information associated with the energy harvesting device. In some examples, the structure of the signaling message 430 and the timing information 435 may be based on a capability of the energy harvesting device (e.g., whether the energy harvesting device includes a battery, or some other device capability).

The timing information 435 may include one or more codepoints that indicate a backscattering timer, one or more codepoints that indicate an offset between a time at which the signaling message 430 is received and the time Tb to initiate the backscattering, a timing sequence to indicate the backscattering timing, or any combination thereof. Different examples for indicating the timing information 435 are described in further detail elsewhere herein, including with reference to FIGS. 5-8.

Figure 5:
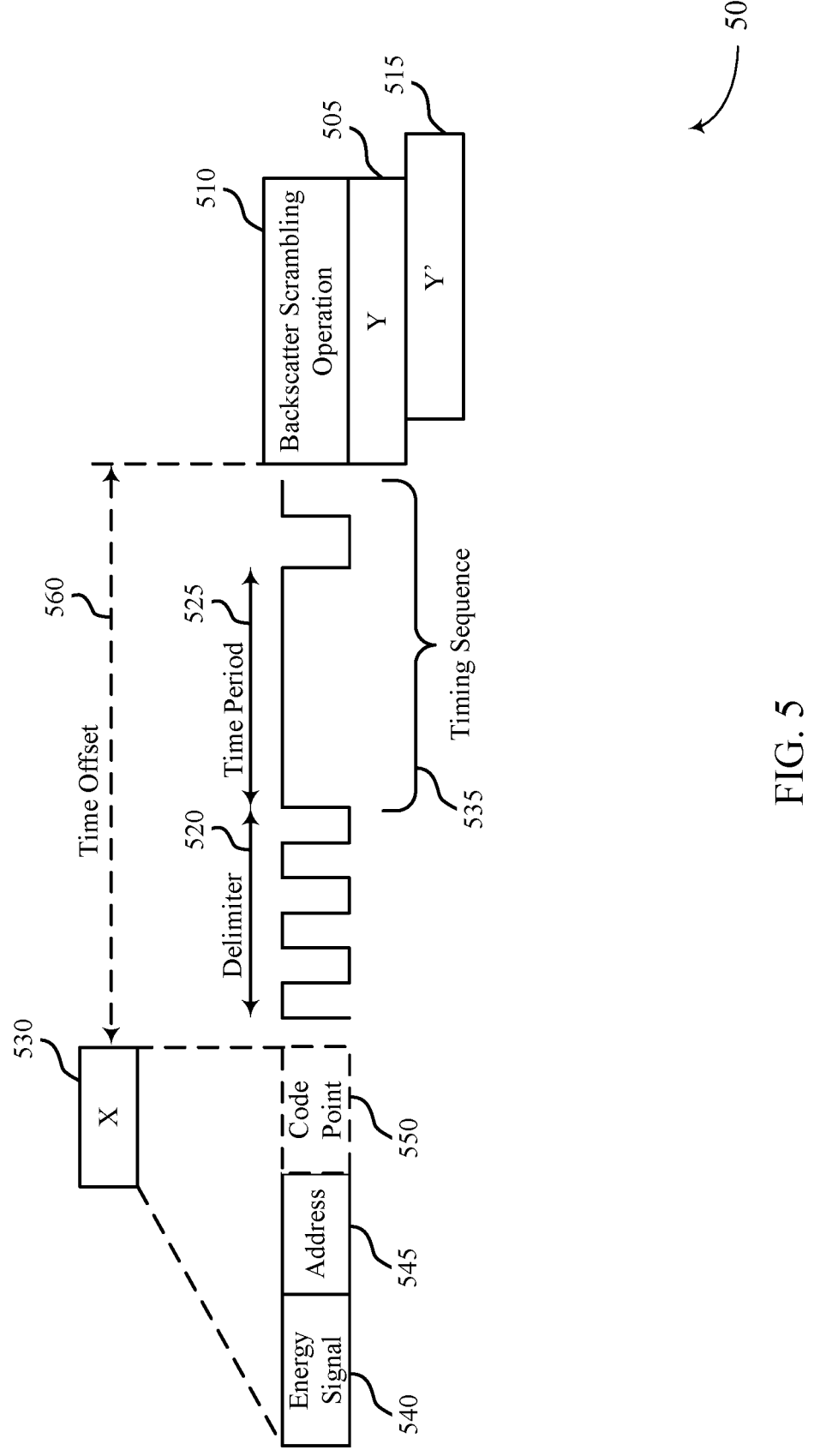
FIG. 5 illustrates an example of a backscatter timing diagram that supports techniques for indicating backscattering timing in accordance with one or more aspects of the present disclosure.

FIG. 5 illustrates an example of a backscatter timing diagram 500 that supports techniques for indicating backscattering timing in accordance with one or more aspects of the present disclosure. The backscatter timing diagram 500 may implement or be implemented by aspects of the wireless communication systems 100 and 200 or the backscatter timing diagrams 300 and 400, as described with reference to FIGS. 1-4. For example, the backscatter timing diagram 500 illustrates a timeline over which an energy harvesting device may receive a message 530 including timing information from an energy transfer device, apply a backscatter scrambling operation 510 to a wireless signal 505, and transmit a backscattered signal. The energy transfer device and the energy harvesting device may represent examples of corresponding wireless devices as described with reference to FIGS. 1-4. The backscatter scrambling operation 510 and the transmission of the backscattered signal 515 may be performed in accordance with the timing information to improve coordination between devices, throughput, and communication reliability.

The energy transfer device may transmit a message 530 (e.g., X) to the energy harvesting device. The message 530 may be referred to as a signaling message in some aspects. The message 530 may include, for example, an energy signal 540 and an address 545. The energy signal 540 may, in some examples, represent an energy transfer signal from which the energy harvesting device may harvest energy. The address 545 may represent address information associated with the wireless signal, such as an ID of the energy transfer device, an ID of the energy harvesting device, other address information, or any combination thereof. The message 530 may additionally include or indicate timing information that indicates when the energy harvesting device is to initiate a backscatter scrambling operation 510.

In some examples, the message 530 may include a set of one or more codepoints 550. The timing information may include at least one codepoint 550 of the set of one or more codepoints 550 that indicates a timer for applying backscattering. For example, the at least one codepoint 550 may represent a field or set of bits in the message 530 that may indicate or point to a backscatter timer. The energy harvesting device may receive the message 530 and decode the codepoint 550 to determine the backscatter timer. The energy harvesting device may start the backscatter timer after reception of the message 530. The energy harvesting device may apply or initiate the backscatter scrambling operation 510 after the backscatter timer expires. In some examples, the energy transfer device may transmit a timing synchronization signal for synchronizing timing between the backscatter timer and the energy transfer device timing. The energy harvesting device may synchronize its timing and the backscatter timer with the energy transfer device based on the synchronization signal.

In some examples, the timing information may include at least one codepoint 550 of the one or more codepoints 550 that indicates a time offset 560 between reception of the message 530 and when to begin the backscattering of the wireless signal. For example, the at least one codepoint 550 may indicate the offset 560 from reception of the message 530 (e.g., a first symbol of the message 530 or a final symbol of the message 530) and the time at which the backscattering is to begin. In some examples, the at least one codepoint 550 may indicate a relatively "rough" estimate of backscatter timing, such as a range of times or offsets within which the backscattering is to be applied (e.g., less than J microseconds (us) and greater than K microseconds (us) between the reception of the message 530 and the start of the backscatter scrambling operation 510).

In some examples, the timing information may include a timing sequence 535 that is appended in the message 530. The energy transfer device may transmit a delimiter 520 (e.g., a sequence of signals or characters) to indicate a start of the timing sequence 535, and the energy transfer device may transmit the timing sequence 535 after the delimiter 520. The timing sequence 535 may include a time period 525, which may be conveyed as a codeword or a signal set high for a given duration of time (e.g., a continuous waveform transmitted for A microseconds after a delimiter indicates a start of a timing sequence), and a low signal or off signal following the time period 525 (e.g., a signal set low for some quantity of time, such as Z microseconds). If the timing information includes the timing sequence 535 appended in the message 530, the energy harvesting device may be indicated to apply the backscatter scrambling operation 510 to the wireless signal 505 after the timing sequence (e.g., after the time period 525 or some integer multiple of the time period (e.g., multiple of A microseconds) after reception of the timing sequence).

By utilizing the timing sequence 535 to indicate backscatter timing, the energy transfer device may support improved synchronization between devices. For example, some energy harvesting devices may be relatively low cost and relatively low complexity. As such, an internal timer at the energy harvesting device may not be precise, or may not be capable of aligning or synchronizing with a timer at the energy transfer device. The timing sequence 535 may provide a representation of the time to the energy harvesting device, which may be more accurate than a timer or offset indication, in some examples. In some aspects, the energy transfer device may indicate a scaling factor for scaling the time period 525, as described in further detail elsewhere herein, including with reference to FIG. 6.

Thus, the message 530 may include timing information in the form of one or more codepoints 550, a timing sequence 535, or both that indicates when the energy harvesting device is to apply backscattering to a wireless signal. The time indicated via the timing information at which the energy harvesting device starts the backscatter scrambling operation 510 may be the same as the time Tb described with reference to FIG. 4, in some examples. For example, the time at which the energy harvesting device starts the backscatter scrambling operation 510 may be the same (or approximately the same, within a threshold time period) as a time at which the energy harvesting device receives the wireless signal 505. The energy harvesting device may thereby apply a backscatter scrambling sequence to the wireless signal 505 (e.g., Y) and transmit a backscattered signal 515 (e.g., Y') to the energy transfer device accordingly, as described with reference to FIG. 4.

Figure 6:
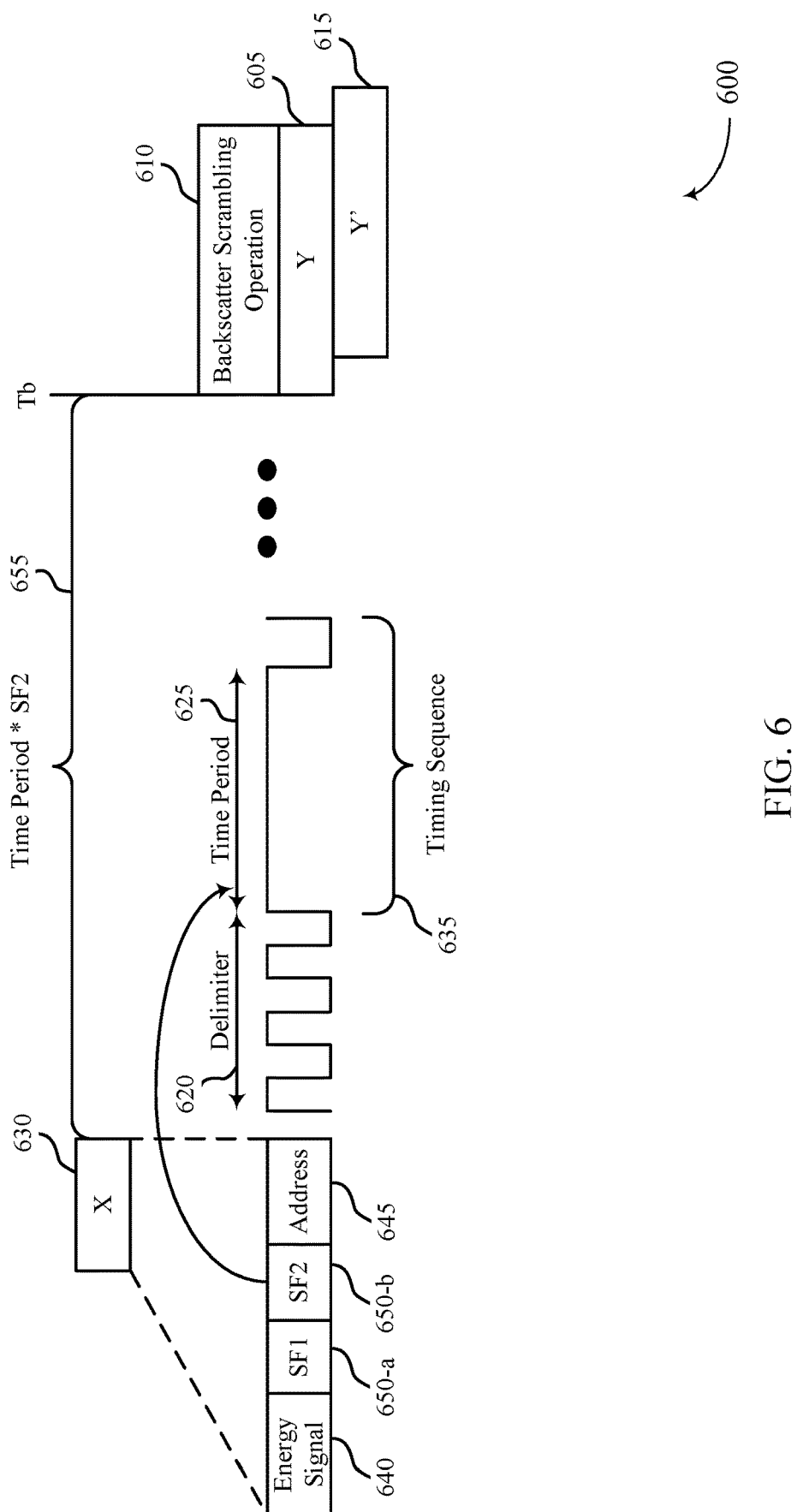
FIG. 6 illustrates an example of a backscatter timing diagram that supports techniques for indicating backscattering timing in accordance with one or more aspects of the present disclosure.

FIG. 6 illustrates an example of a backscatter timing diagram 600 that supports techniques for indicating backscattering timing in accordance with one or more aspects of the present disclosure. The backscatter timing diagram 600 may implement or be implemented by aspects of the wireless communication systems 100 and 200 or the backscatter timing diagrams 300, 400, and 500, as described with reference to FIGS. 1-5. For example, the backscatter timing diagram 600 illustrates a timeline over which an energy harvesting device may receive a message 630 including timing information from an energy transfer device, apply a backscatter scrambling operation 610 to a wireless signal 605, and transmit a backscattered signal 615. The energy transfer device and the energy harvesting device may represent examples of corresponding wireless devices as described with reference to FIGS. 1-5. The backscatter scrambling operation 610 and the transmission of the backscattered signal 615 may be performed in accordance with the timing information to improve coordination between devices, throughput, and communication reliability.

The energy transfer device may transmit a message 630 (e.g., X) to the energy harvesting device. The message 630 may be referred to as a signaling message in some aspects. The message 630 may include, for example, an energy signal 640 and an address 645, which may represent examples of the energy signal 540 and the address 545, as described with reference to FIG. 5. The message 630 may additionally include or indicate timing information that indicates when the energy harvesting device is to initiate a backscatter scrambling operation 610.

In this example, the timing information may include a timing sequence 635 that is appended in the message 630. The timing sequence 635 may represent an example of the timing sequence 535 described with reference to FIG. 5. For example, the timing sequence 635 may start after transmission of a delimiter 620 and the timing sequence 635 may include a time period 625 indicated by a high signal followed by a low signal for a duration (e.g., Z microseconds). In this example, the timing information may additionally, or alternatively, include one or more scaling factors 650 (e.g., SF1 650-a, SF2 650-b). The scaling factors 650 may be indicated via one or more signaling fields in the message 630 (e.g., combining a signaling field with the timing sequence 635). One or more bits in the signaling field may indicate the scaling factor 650 (e.g., 8, 0.125, 64, or 1). In an example, the energy harvesting device may apply backscatter scrambling after a time period that is a product of the scaling factor 650 and a duration A of the time period 625 (e.g., Tb=SF*A microseconds)

The energy harvesting device may be indicated to apply the backscatter scrambling operation 610 beginning at a time Tb after the message 630 is received, where the time, Tb, may be determined based on a product of the time period 625 and the scaling factor 650. In the example of FIG. 6, the scaling factor 650-b (e.g., SF2) may be indicated for the energy harvesting device. As such a duration of time or offset 655 between reception of the message 630 and the time Tb at which the backscatter scrambling operation begins may be equal to a product of SF2 650-*b* and the time period 625 indicated via the timing sequence 635.

In some examples, if the timing sequence 635 is relatively short, the energy transfer device may determine to refrain from indicating a scaling factor 650 and may instead transmit the whole timing sequence 635 to improve timing synchronization at the energy harvesting device. However, by using the scaling factor 650 for relatively long timing sequences 635, the energy transfer device may reduce overhead associated with the timing sequence 635. For example, if the timing sequence 635 is relatively long, the scaling factor 650 may provide for a reduced timing sequence 635 to be transmitted while maintaining the desired backscatter timing, which may reduce overhead and improve reliability.

In some examples, the energy transfer device may communicate with multiple energy harvesting devices. It may be beneficial for the energy harvesting device to TDM backscattered communications by the multiple energy harvest devices based on a same broadcast wireless signal 605 (e.g., or multiple wireless signals 605). To facilitate such multi-device backscattered communications, the energy transfer device may indicate multiple scaling factors 650 via the signaling message 630 for different devices or users. For example, the scaling factor 650-*a* (SF1) may be for a first energy harvesting device and the scaling factor 650-*b* (SF2) may be for a second energy harvesting device. The scaling factor 650-*a* may be different than the scaling factor 650-*b*. The multiple scaling factors 650 may provide for the multiple energy harvesting devices to be TDMed and backscatter a same wireless signal 605 (e.g., a same Y sequence). For example, the first energy harvesting device may apply a backscatter scrambling operation 610 and transmit a first backscattered signal 615 at a first time that is based on a product of the time period 625 and the first scaling factor 650-*a*. The second energy harvesting device may apply a backscatter scrambling operation 610 and transmit a second backscattered signal 615 at a second time that is based on a product of the time period 625 and the second scaling factor 650-*b*, where the second time is different than the first time. The energy transfer device may thereby monitor for and receive the first backscattered signal 615 at the first time and the second backscattered signal 615 at the second time.

The message 630 described herein may thereby include backscatter timing information in the form of a timing sequence 635 or a timing sequence 635 and one or more scaling factors 650 that indicate when the energy harvesting device is to apply backscattering to a wireless signal 605. The time indicated by the timing sequence 635 and/or the scaling factor 650 may be the same as the time Tb described with reference to FIG. 4, in some examples. For example, the time at which the energy harvesting device starts the backscatter scrambling operation 610 may be the same (or approximately the same, within a threshold time period) as a time at which the energy harvesting device receives the wireless signal 605. The energy harvesting device may thereby apply a backscatter scrambling sequence to the wireless signal 605 (e.g., Y) and transmit a backscattered signal 615 (e.g., Y') to the energy transfer device accordingly.

Figure 7:
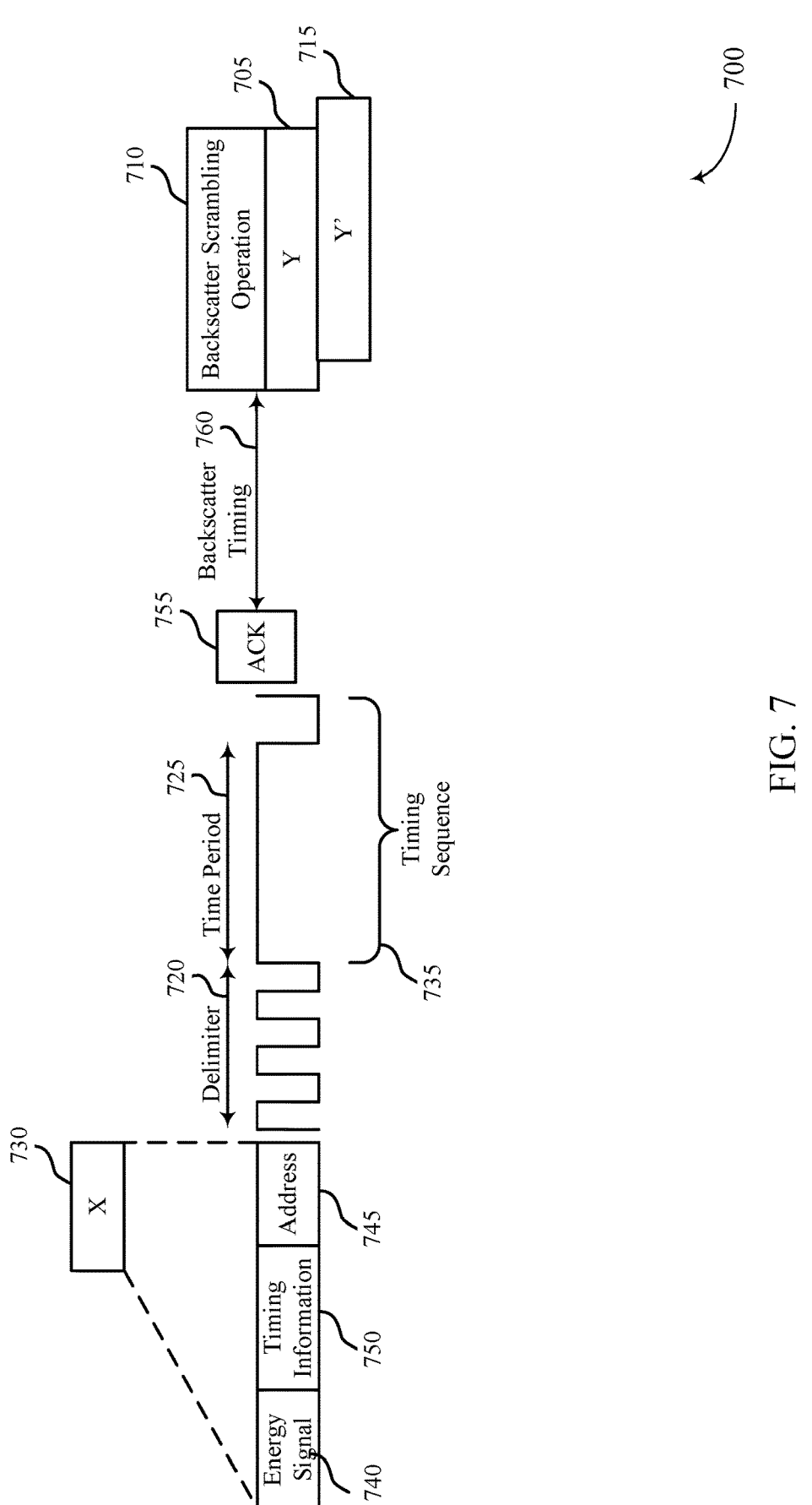
FIG. 7 illustrates an example of a backscatter timing diagram that supports techniques for indicating backscattering timing in accordance with one or more aspects of the present disclosure.

FIG. 7 illustrates an example of a backscatter timing diagram 700 that supports techniques for indicating backscattering timing in accordance with one or more aspects of the present disclosure. The backscatter timing diagram 700 may implement or be implemented by aspects of the wireless communication systems 100 and 200 or the backscatter timing diagrams 300, 400, 500, and 600, as described with reference to FIGS. 1-6. For example, the backscatter timing diagram 700 illustrates a timeline over which an energy harvesting device may receive a message 730 including timing information from an energy transfer device, apply a backscatter scrambling operation 710 to a wireless signal 705, and transmit a backscattered signal 715. The energy transfer device and the energy harvesting device may represent examples of corresponding wireless devices as described with reference to FIGS. 1-6. The backscatter scrambling operation 710 and the transmission of the backscattered signal 715 may be performed in accordance with the timing information to improve coordination between devices, throughput, and communication reliability.

The energy transfer device may transmit a message 730 (e.g., X) to the energy harvesting device. The message 730 may include, for example, an energy signal 740 and an address 745, which may represent examples of the energy signal 540 and the address 545, as described with reference to FIG. 5. The message 730 may additionally include or indicate timing information 750 that indicates when the energy harvesting device is to initiate a backscatter scrambling operation 710.

In this example, the energy harvesting device may transmit an ACK 755 (e.g., a feedback message) after reception of the message 730 including the backscatter timing information 750. The ACK 755 may acknowledge that the energy harvesting device received and obtained the timing information 750. The energy harvesting device may determine when to initiate the backscatter scrambling operation 710 based on the timing information 750 indicated via the message 730 and a timing of the transmission of the ACK 755.

The timing information 750 may be in the form of one or more codepoints in the message 730 that indicate a backscatter timer or an offset between the message 730 and the backscatter scrambling operation 710, as described in further detail with reference to FIG. 5. Additionally, or alternatively, the timing information 750 may be in the form of a delimiter 720 and a timing sequence 735 appended in the message 730. The timing sequence 735 may indicate a time period 725 for applying backscattering, as described in further detail with reference to FIG. 6. Irrespective of the format via which the timing information 750 is conveyed, the energy harvesting device may receive the message 730, obtain the timing information 750, and determine a backscatter timing 760 based on the timing information 750. The backscatter timing 760 may be a time period 725, a product of a time period 725 and a scaling factor, an offset, a timer, a time instance, or some other representation of a time at which the energy harvesting device is to initiate backscatter.

As described herein, when the energy harvesting device transmits an ACK 755 in response to the message 730 including the timing information 750, the backscatter timing 760 indicated by the timing information 750 may start based on the timing of the ACK 755. In some examples, the energy harvesting device may start the backscatter timing 760 when the transmission of the ACK 755 starts. For example, the backscatter timing 760 may represent a timer, offset, or time period that starts at a starting symbol of the ACK 755. In some other examples, the energy harvesting device may start the backscatter timing 760 after a last symbol transmission of the ACK 755. For example, the backscatter timing 760 may represent a timer, offset, or time period that starts after a final or ending symbol of the ACK 755 is transmitted. Rules or guidelines for when to start the backscatter timing 760 if feedback is transmitted may be configured (e.g., pre-configured or standardized) or indicated via signaling exchanged between the devices.

In either case, the energy harvesting device may initiate the backscatter scrambling operation 710 at a second time at which the backscatter timing 760 expires (e.g., a timer expires). The energy harvesting device may apply a backscatter scrambling sequence to the wireless signal 705 and transmit a backscattered signal 715 in accordance with the backscatter timing 760.

An energy harvesting device as described herein may thereby apply a backscatter timing 760 indicated by an energy transfer device via a message 730 based on a timing of transmission of an ACK 755 by the energy harvesting device, which may provide for the energy harvesting device to transmit feedback in response to the message 730. As such, if the energy harvesting device does not receive the timing information 750, the energy harvesting device may transmit a NACK, and the energy transfer device may retransmit the timing information 750 before expecting to receive a backscattered signal 715. Thus, by adjusting the backscatter timing 760 based on the feedback timing, the devices may support improved coordination, improved throughput, and reduced latency.

Figure 8:
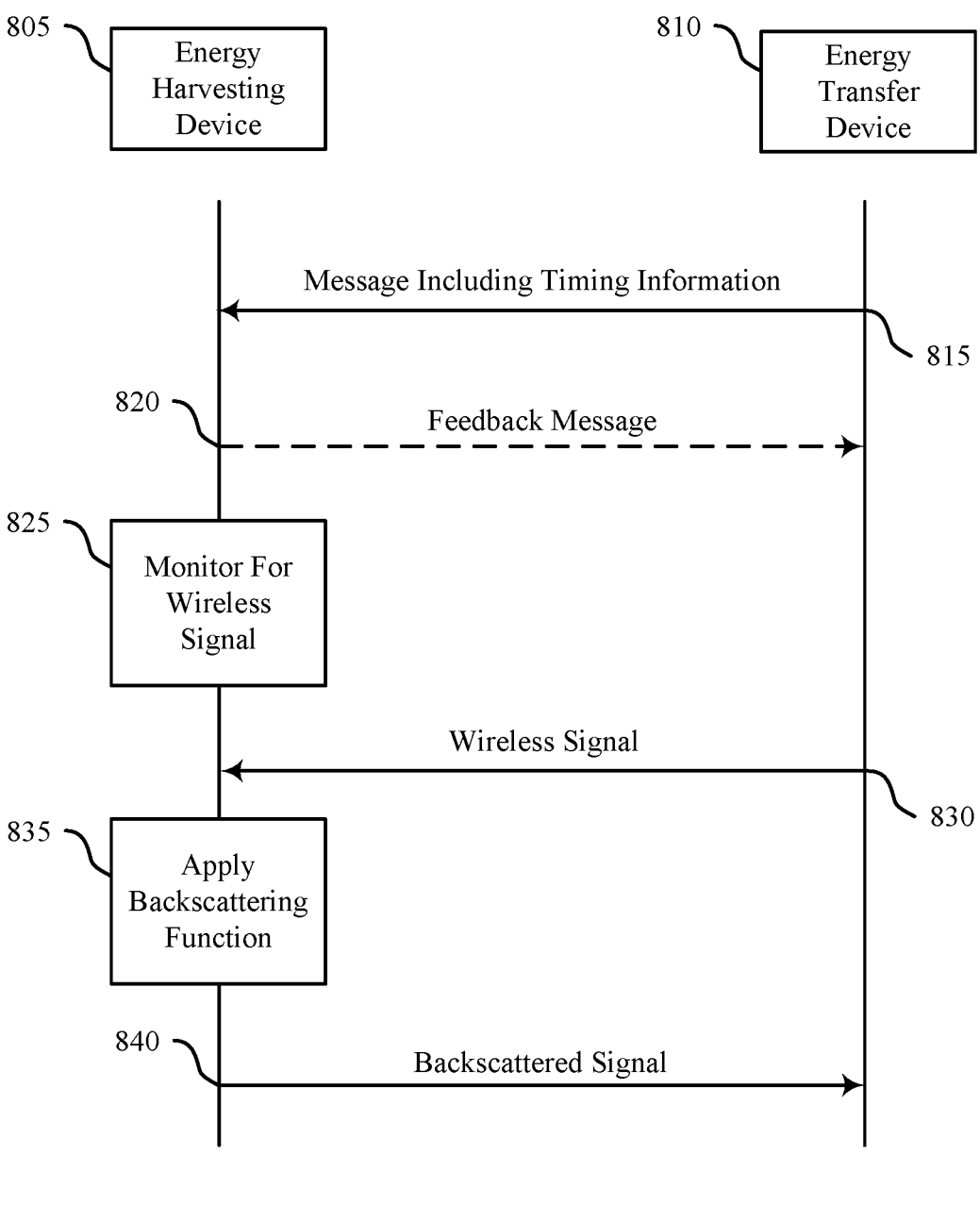
FIG. 8 illustrates an example of a process flow that supports techniques for indicating backscattering timing in accordance with one or more aspects of the present disclosure.

FIG. 8 illustrates an example of a process flow 800 that supports techniques for indicating backscattering timing in accordance with one or more aspects of the present disclosure. The process flow 800 may implement or be implemented by aspects of the wireless communication systems 100 and 200 and the backscatter timing diagrams 300, 400, 500, 600, and 700, as described with reference to FIGS. 1-7. For example, the process flow 800 may include an energy harvesting device 805 and an energy transfer device 810, which may represent examples of corresponding devices described herein. The process flow 800 illustrates communications between the energy harvesting device 805 and the energy transfer device 810 to indicate timing information for backscattering wireless communications.

In the following description of the process flow 800, the operations between the energy harvesting device 805 and the energy transfer device 810 may be performed in different orders or at different times. Some operations may also be left out of the process flow 800, or other operations may be added. Although the energy harvesting device 805 and the energy transfer device 810 are shown performing the operations of the process flow 800, some aspects of some operations may also be performed by one or more other wireless devices.

At 815, the energy transfer device 810 may transmit, to the energy harvesting device 805, a message including timing information that indicates when the energy harvesting device 805 is to begin backscattering of a wireless signal of the energy transfer device 810. The timing information may be a codepoint of a set of one or more codepoints in the message that indicate a backscattering timer, or a codepoint that indicates an offset between reception of the message and when to begin backscattering, or a timing sequence that indicates when the energy harvesting device 805 is to begin backscattering, or any combination thereof, as described with reference to FIGS. 5-7.

The energy harvesting device 805 may decode the message to obtain the timing information. At 820, in some examples, the energy harvesting device 805 may transmit a feedback message that acknowledges receipt of the message including the timing information.

At 825, the energy harvesting device 805 may monitor for the wireless signal from the energy transfer device 810 based on the message. At 830, the energy harvesting device 805 may receive the wireless signal from the energy transfer device 810. The wireless signal may be a reference signal (e.g., a PRS), or some other type of signal.

At 835, the energy harvesting device 805 may apply a backscattering function to the wireless signal in accordance with the timing information. For example, the energy harvesting device 805 may apply the backscattering function to the wireless signal at a time that is indicated by the timing information. Applying the backscattering function may include modulating or scrambling the wireless signal using a backscatter scrambling sequence, as described in further detail elsewhere herein, including with reference to FIGS. 2-7.

At 840, the energy harvesting device 805 may transmit a backscattered signal to the energy transfer device 810 based on the application of the backscattering function to the wireless signal in accordance with the timing information. The energy transfer device 810 may monitor for and receive the backscattered signal based on the timing information. In some examples, the wireless signal may be a reference signal or a PRS, and the energy transfer device 810 may determine a position of the energy harvesting device 805 based on receiving the backscattered signal.

The energy transfer device 810 may thereby indicate backscatter timing information to the energy harvesting device 805. By indicating the backscatter timing information, the energy transfer device 810 may know when to monitor for and receive a backscattered signal, which may improve reliability and throughput of the backscattered communications. Additionally, or alternatively, the alignment of the backscatter timing may improve a backscattering operation by increasing an amount of the wireless signal that is scrambled using the backscatter scrambling sequence.

Figure 9:
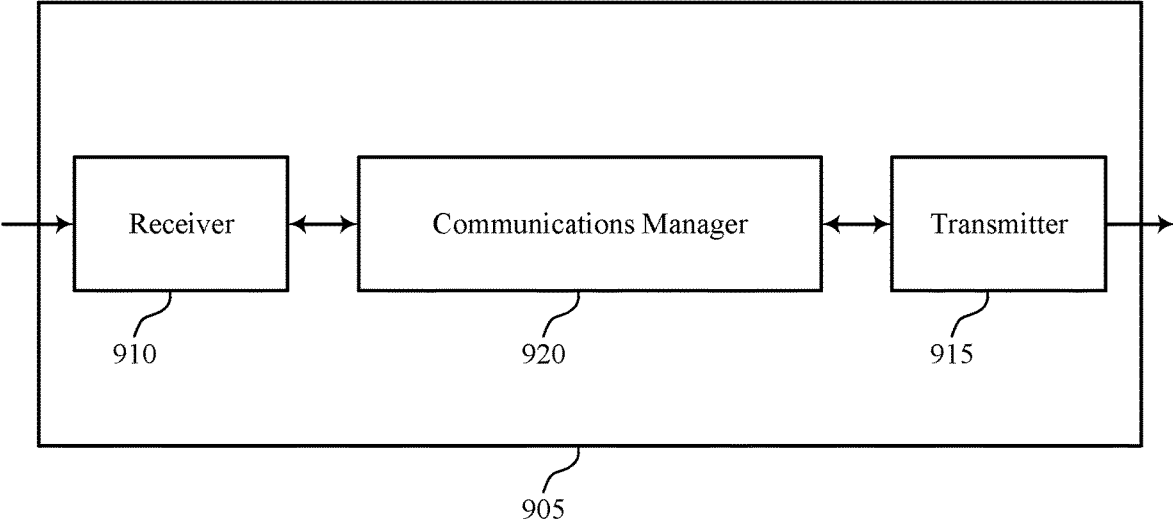
FIGS. 9 and 10 illustrate block diagrams of devices that support techniques for indicating backscattering timing in accordance with one or more aspects of the present disclosure.

FIG. 9 illustrates a block diagram 900 of a device 905 that supports techniques for indicating backscattering timing in accordance with one or more aspects of the present disclosure. The device 905 may be an example of aspects of a UE 115 or a network entity 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the backscattering timing indication features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating backscattering timing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating backscattering timing). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for indicating backscattering timing as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at an energy harvesting device in accordance with examples as disclosed herein. For example, the communications manager 920 may be configured as or otherwise support a means for receiving, from a wireless device, a message that includes timing information that indicates when the energy harvesting device is to begin backscattering of a wireless signal of the wireless device. The communications manager 920 may be configured as or otherwise support a means for monitoring for the wireless signal from the wireless device based on the message. The communications manager 920 may be configured as or otherwise support a means for transmitting a backscattered signal based on application of a backscattering function to the wireless signal in accordance with the timing information.

Additionally, or alternatively, the communications manager 920 may support wireless communication at an energy transferring device in accordance with examples as disclosed herein. For example, the communications manager 920 may be configured as or otherwise support a means for transmitting a message that includes timing information that indicates when backscattering of a wireless signal is to begin. The communications manager 920 may be configured as or otherwise support a means for transmitting the wireless signal based on the message. The communications manager 920 may be configured as or otherwise support a means for receiving a backscattered signal based on a backscattering function that is applied to the wireless signal in accordance with the timing information.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources, among other advantages.

Figure 10:
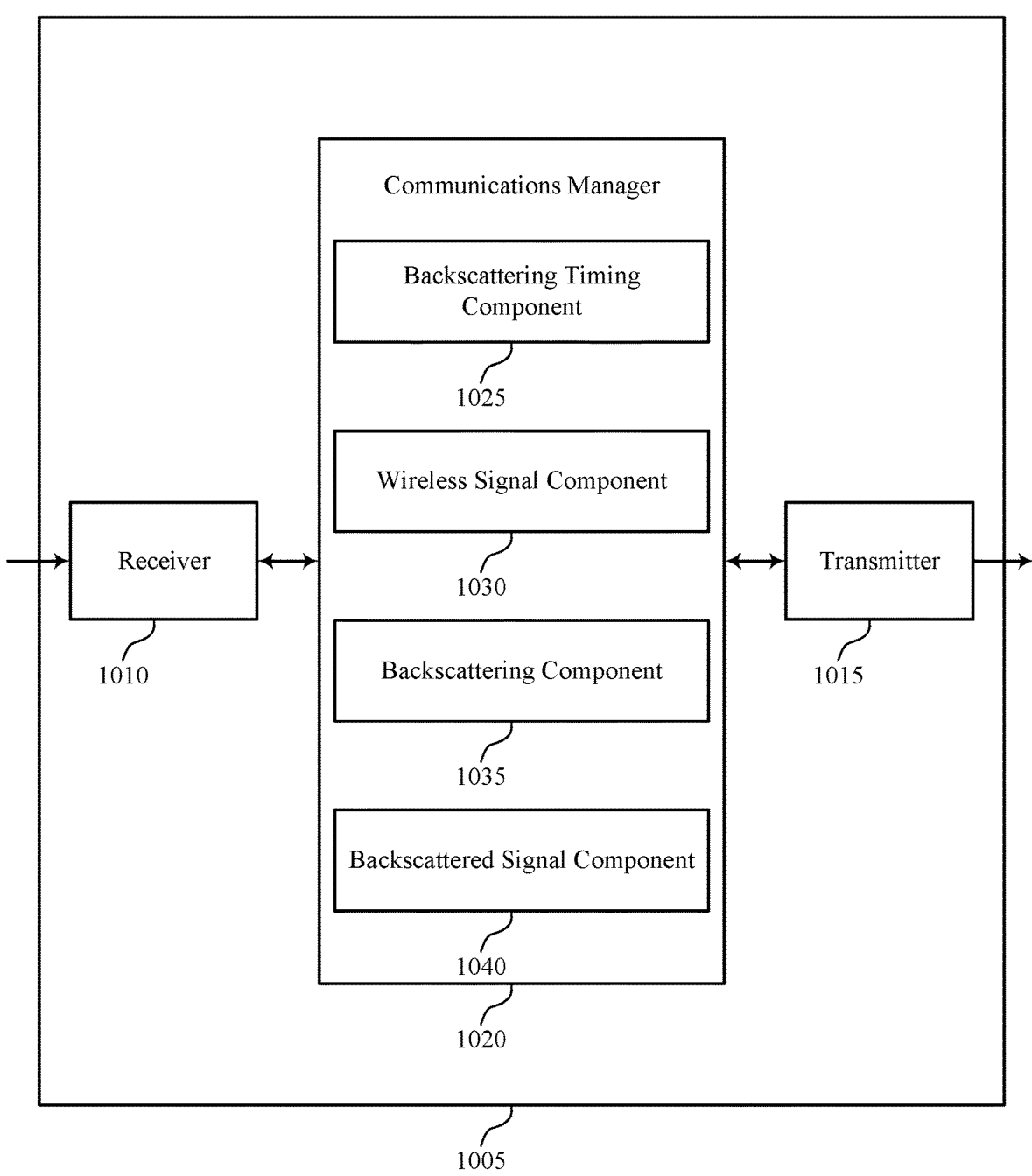

FIG. 10 illustrates a block diagram 1000 of a device 1005 that supports techniques for indicating backscattering timing in accordance with one or more aspects of the present disclosure. The device 1005 may be an example of aspects of a device 905, a UE 115, or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for indicating backscattering timing). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for indicating backscattering timing). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for indicating backscattering timing as described herein. For example, the communications manager 1020 may include a backscattering timing component 1025, a wireless signal component 1030, a backscattering component 1035, a backscattered signal component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter

1015, or both to obtain information, output information, or perform various other operations as described herein.

The communications manager 1020 may support wireless communication at an energy harvesting device in accordance with examples as disclosed herein. The backscattering timing component 1025 may be configured as or otherwise support a means for receiving, from a wireless device, a message that includes timing information that indicates when the energy harvesting device is to begin backscattering of a wireless signal of the wireless device. The wireless signal component 1030 may be configured as or otherwise support a means for monitoring for the wireless signal from the wireless device based on the message. The backscattering component 1035 may be configured as or otherwise support a means for transmitting a backscattered signal based on application of a backscattering function to the wireless signal in accordance with the timing information.

Additionally, or alternatively, the communications manager 1020 may support wireless communication at an energy transferring device in accordance with examples as disclosed herein. The backscattering timing component 1025 may be configured as or otherwise support a means for transmitting a message that includes timing information that indicates when backscattering of a wireless signal is to begin. The wireless signal component 1030 may be configured as or otherwise support a means for transmitting the wireless signal based on the message. The backscattered signal component 1040 may be configured as or otherwise support a means for receiving a backscattered signal based on a backscattering function that is applied to the wireless signal in accordance with the timing information.

In some cases, the backscattering timing component 1025, the wireless signal component 1030, the backscattering component 1035, and the backscattered signal component 1040 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the backscattering timing component 1025, the wireless signal component 1030, the backscattering component 1035, and the backscattered signal component 1040 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
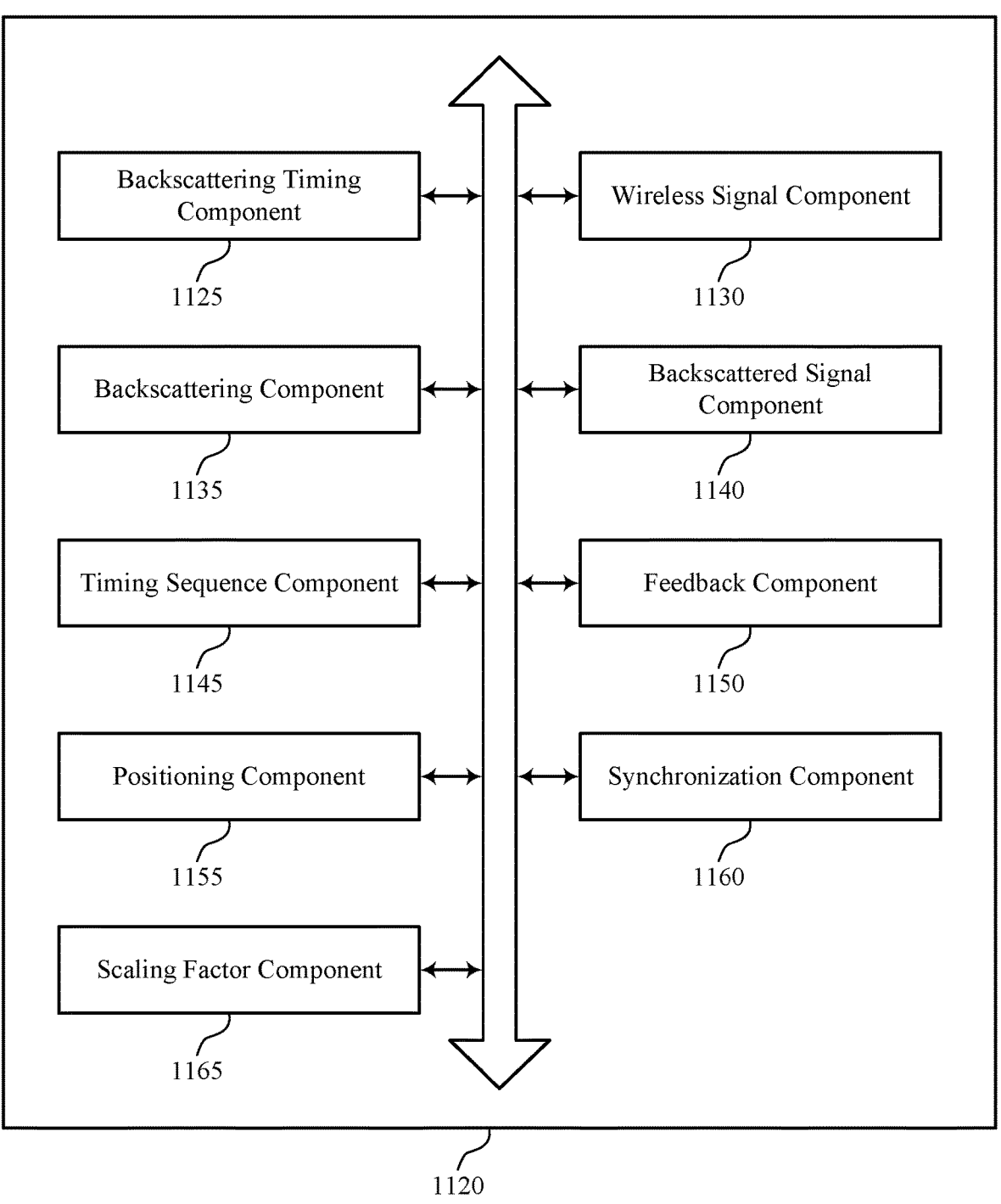
FIG. 11 illustrates a block diagram of a communications manager that supports techniques for indicating backscattering timing in accordance with one or more aspects of the present disclosure.

FIG. 11 illustrates a block diagram 1100 of a communications manager 1120 that supports techniques for indicating backscattering timing in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for indicating backscattering timing as described herein. For example, the communications manager 1120 may include a backscattering timing component 1125, an energy transfer component 1130, a backscattering component 1135, a backscattered signal component 1140, a timing sequence component 1145, a feedback component 1150, a positioning component 1155, a synchronization component 1160, a scaling factor component 1165, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at an energy harvesting device in accordance with examples as disclosed herein. The backscattering timing component 1125 may be configured as or otherwise support a means for receiving, from a wireless device, a message that includes timing information that indicates when the energy harvesting device is to begin backscattering of a wireless signal of the wireless device. The energy transfer component 1130 may be configured as or otherwise support a means for monitoring for the wireless signal from the wireless device based on the message. The backscattering component 1135 may be configured as or otherwise support a means for transmitting a backscattered signal based on application of a backscattering function to the wireless signal in accordance with the timing information.

In some examples, to support receiving the message that includes the timing information, the backscattering timing component 1125 may be configured as or otherwise support a means for receiving the message that indicates the timing information as a first codepoint of a set of one or more codepoints for a backscattering timer, where the backscattering function is applied to the wireless signal after an expiration of the backscattering timer.

In some examples, the synchronization component 1160 may be configured as or otherwise support a means for receiving a timing synchronization signal for synchronizing timing between the backscattering timer and the wireless device.

In some examples, to support receiving the message that includes the timing information, the backscattering timing component 1125 may be configured as or otherwise support a means for receiving the message that indicates the timing information as a first codepoint of a set of one or more codepoints, the first codepoint indicating a time offset between reception of the message and when to begin the backscattering of the wireless signal, where the backscattering function is applied to the wireless signal based on the time offset.

In some examples, to support receiving the message that includes the timing information, the timing sequence component 1145 may be configured as or otherwise support a means for receiving the message that indicates a timing sequence identifying when the energy harvesting device is to begin the backscattering of the wireless signal, where the backscattering function is applied to the wireless signal based on the timing sequence.

In some examples, the timing sequence component 1145 may be configured as or otherwise support a means for receiving a transmission including a delimiter indicating a start of the timing sequence, where the backscattering function is applied to the wireless signal based on the timing sequence and the delimiter.

In some examples, the timing sequence component 1145 may be configured as or otherwise support a means for applying the backscattering function to the wireless signal after detecting an end of reception of the timing sequence.

In some examples, to support receiving the message that includes the timing information, the scaling factor component 1165 may be configured as or otherwise support a means for receiving, via a field in the message, an indication of a scaling factor for scaling the timing sequence. In some examples, to support receiving the message that includes the timing information, the backscattering timing component 1125 may be configured as or otherwise support a means for applying the backscattering function to the wireless signal beginning at a time after the message is received, the time determined based on a product of the scaling factor and a time duration indicated by the timing sequence.

In some examples, the scaling factor component 1165 may be configured as or otherwise support a means for selecting the scaling factor from among a set of multiple scaling factors indicated via the message based on an index of the scaling factor associated with the energy harvesting device, where each scaling factor of the set of multiple scaling factors is associated with a respective energy harvesting device of a set of multiple energy harvesting devices.

In some examples, the feedback component 1150 may be configured as or otherwise support a means for transmitting a feedback message that acknowledges receipt of the message including the timing information. In some examples, the backscattering timing component 1125 may be configured as or otherwise support a means for applying the backscattering function to the wireless signal beginning at a first time that is offset relative to the feedback message, where the timing information indicates the offset. In some examples, the offset may be relative to a beginning symbol period or an ending symbol period of the feedback message.

In some examples, the energy transfer component 1130 may be configured as or otherwise support a means for receiving the wireless signal, where the wireless signal includes a reference signal or a PRS.

Additionally, or alternatively, the communications manager 1120 may support wireless communication at an energy transferring device in accordance with examples as disclosed herein. In some examples, the backscattering timing component 1125 may be configured as or otherwise support a means for transmitting a message that includes timing information that indicates when backscattering of a wireless signal is to begin. In some examples, the energy transfer component 1130 may be configured as or otherwise support a means for transmitting the wireless signal based on the message. The backscattered signal component 1140 may be configured as or otherwise support a means for receiving a backscattered signal based on a backscattering function that is applied to the wireless signal in accordance with the timing information.

In some examples, to support transmitting the message that includes the timing information, the backscattering timing component 1125 may be configured as or otherwise support a means for transmitting the message that indicates the timing information as a first codepoint of a set of one or more codepoints for a backscattering timer, where the backscattering function is applied to the wireless signal after an expiration of the backscattering timer.

In some examples, the synchronization component 1160 may be configured as or otherwise support a means for transmitting a timing synchronization signal for synchronizing timing between the backscattering timer and the energy transferring device.

In some examples, to support transmitting the message that includes the timing information, the backscattering timing component 1125 may be configured as or otherwise support a means for transmitting the message that indicates the timing information as a first codepoint of a set of one or more codepoints, the first codepoint indicating a time offset between reception of the message and when to begin the backscattering of the wireless signal, where the backscattering function is applied to the wireless signal based on the time offset.

In some examples, to support transmitting the message that includes the timing information, the timing sequence component 1145 may be configured as or otherwise support a means for transmitting the message that indicates a timing sequence identifying when the backscattering of the wireless signal is to begin, where the backscattering function is applied to the wireless signal based on the timing sequence.

In some examples, the timing sequence component 1145 may be configured as or otherwise support a means for transmitting a transmission including a delimiter indicating a start of the timing sequence, where the backscattering function is applied to the wireless signal based on the timing sequence and the delimiter.

In some examples, to support transmitting the message that includes the timing information, the scaling factor component 1165 may be configured as or otherwise support a means for transmitting, via a field in the message, an indication of a scaling factor for scaling the timing sequence, where the backscattering function is applied to the wireless signal beginning at a second time after the message is received, the second time determined based on a product of the scaling factor and a time duration indicated by the timing sequence.

In some examples, to support transmitting the message that includes the timing information, the scaling factor component 1165 may be configured as or otherwise support a means for transmitting, via one or more fields in the message, an indication of a set of multiple scaling factors for scaling the timing sequence, where each scaling factor of the set of multiple scaling factors is associated with a respective energy harvesting device of a set of multiple energy harvesting devices.

In some examples, the backscattered signal component 1140 may be configured as or otherwise support a means for receiving a set of multiple backscattered signals including the backscattered signal, where each backscattered signal of the set of multiple backscattered signals is received from a respective energy harvesting device of the set of multiple energy harvesting devices at a respective time after the message is transmitted, the respective time based on a scaling factor of the set of multiple scaling factors that is associated with the respective energy harvesting device.

In some examples, the feedback component 1150 may be configured as or otherwise support a means for receiving a feedback message that acknowledges receipt of the message including the timing information, where the backscattering function is applied to the wireless signal beginning at a first time that is offset relative to the feedback message, where the timing information indicates the offset. In some examples, the offset may be relative to a beginning symbol period or an ending symbol period of the feedback message.

In some examples, the positioning component 1155 may be configured as or otherwise support a means for determining a position of an energy harvesting device based on receiving the backscattered signal, where the wireless signal includes a reference signal or a PRS.

In some cases, the backscattering timing component 1125, the energy transfer component 1130, the backscattering component 1135, the backscattered signal component 1140, the timing sequence component 1145, the feedback component 1150, the positioning component 1155, the synchronization component 1160, and the scaling factor component 1165 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the backscattering timing component 1125, the energy transfer component 1130, the backscattering component 1135, the backscattered signal component 1140, the timing sequence component 1145, the feedback component 1150, the positioning component 1155, the synchronization component 1160, and the scaling factor component 1165 discussed herein.

Figure 12:
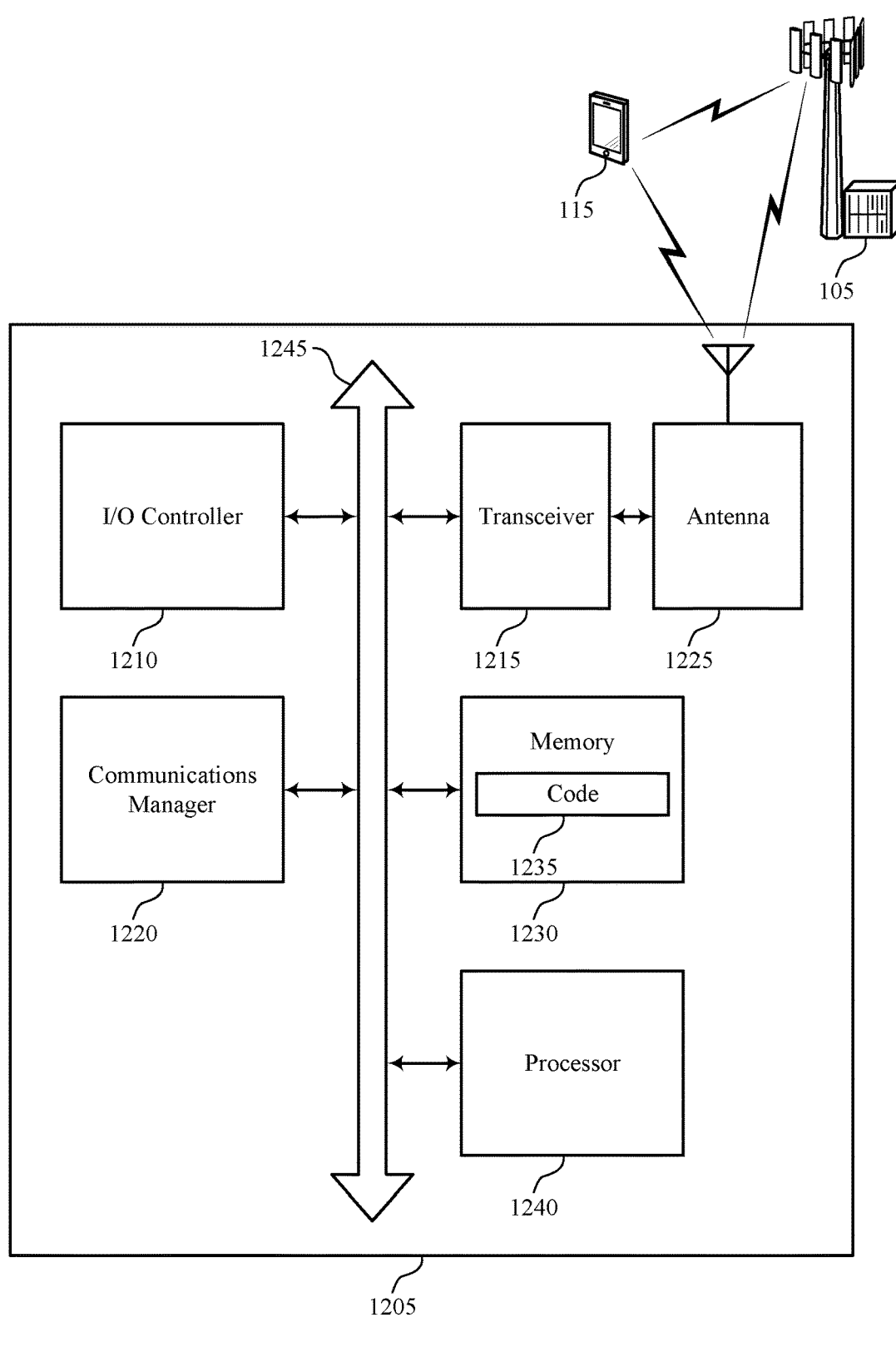
FIG. 12 illustrates a diagram of a system including a UE that supports techniques for indicating backscattering timing in accordance with one or more aspects of the present disclosure.

FIG. 12 illustrates a diagram of a system 1200 including a device 1205 that supports techniques for indicating backscattering timing in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for indicating backscattering timing). For example, the device 1205 or a component of the device 1205 may include a processor 1240 and memory 1230 coupled with or to the processor 1240, the processor 1240 and memory 1230 configured to perform various functions described herein.

Additionally, or alternatively, the communications manager 1220 may support wireless communication at an energy harvesting device in accordance with examples as disclosed herein. For example, the communications manager 1220 may be configured as or otherwise support a means for receiving, from a wireless device, a message that includes timing information that indicates when the energy harvesting device is to begin backscattering of a wireless signal of the wireless device. The communications manager 1220 may be configured as or otherwise support a means for monitoring for the wireless signal from the wireless device based on the message. The communications manager 1220 may be configured as or otherwise support a means for transmitting a backscattered signal based on application of a backscattering function to the wireless signal in accordance with the timing information.

Additionally, or alternatively, the communications manager 1220 may support wireless communication at an energy transferring device in accordance with examples as disclosed herein. For example, the communications manager 1220 may be configured as or otherwise support a means for transmitting a message that includes timing information that indicates when backscattering of a wireless signal is to begin. The communications manager 1220 may be configured as or otherwise support a means for transmitting the wireless signal based on the message. The communications manager 1220 may be configured as or otherwise support a means for receiving a backscattered signal based on a backscattering function that is applied to the wireless signal in accordance with the timing information.

By including or configuring the communications manager 1220 in accordance with examples as described herein, the device 1205 may support techniques for improved communication reliability, reduced latency, reduced power consumption, more efficient utilization of communication resources, and improved coordination between devices, among other advantages.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for indicating backscattering timing as described herein, or the processor 1240 and the memory 1230 may be otherwise configured to perform or support such operations.

Figure 13:
FIG. 13 illustrates a diagram of a system including a network entity that supports techniques for indicating backscattering timing in accordance with one or more aspects of the present disclosure.

FIG. 13 illustrates a diagram of a system 1300 including a device 1305 that supports techniques for indicating back-scattering timing in accordance with one or more aspects of the present disclosure. The device 1305 may be an example of or include the components of a device 905, a device 1005, or a network entity 105 as described herein. The device 1305 may communicate with one or more network entities 105, one or more UEs 115, or any combination thereof, which may include communications over one or more wired inter-faces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless trans-missions (e.g., concurrently). The transceiver 1310 may also include a modem to modulate signals, to provide the modu-lated signals for transmission (e.g., by one or more antennas 1315, by a wired transmitter), to receive modulated signals (e.g., from one or more antennas 1315, from a wired receiver), and to demodulate signals. In some implementa-tions, the transceiver 1310 may include one or more inter-faces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementa-tions, the transceiver 1310 may include or be configured for coupling with one or more processors or memory compo-nents that are operable to perform or support operations based on received or obtained information or signals, or to generate information or other signals for transmission or other outputting, or any combination thereof. In some imple-mentations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support com-munications via one or more communications links (e.g., a communication link 125, a backhaul communication link 120, a midhaul communication link 162, a fronthaul com-munication link 168).

The memory 1325 may include RAM and ROM. The memory 1325 may store computer-readable, computer-ex-ecutable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for indicating backscattering timing). For example, the device 1305 or a component of the device 1305 may include a processor 1335 and memory 1325 coupled with the proces-sor 1335, the processor 1335 and memory 1325 configured to perform various functions described herein. The proces-sor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and pro-cesses the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The pro-cessing system of the device 1305 may interface with other components of the device 1305, and may process informa-tion received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

Additionally, or alternatively, the communications manager 1320 may support wireless communication at an energy harvesting device in accordance with examples as disclosed herein. For example, the communications manager 1320 may be configured as or otherwise support a means for receiving, from a wireless device, a message that includes timing information that indicates when the energy harvesting device is to begin backscattering of a wireless signal of the wireless device. The communications manager 1320 may be configured as or otherwise support a means for monitoring for the wireless signal from the wireless device based on the message. The communications manager 1320 may be configured as or otherwise support a means for transmitting a backscattered signal based on application of a backscattering function to the wireless signal in accordance with the timing information.

Additionally, or alternatively, the communications manager 1320 may support wireless communication at an energy transferring device in accordance with examples as disclosed herein. For example, the communications manager 1320 may be configured as or otherwise support a means for transmitting a message that includes timing information that indicates when backscattering of a wireless signal is to begin. The communications manager 1320 may be configured as or otherwise support a means for transmitting the wireless signal based on the message. The communications manager 1320 may be configured as or otherwise support a means for receiving a backscattered signal based on a backscattering function that is applied to the wireless signal in accordance with the timing information.

By including or configuring the communications manager 1320 in accordance with examples as described herein, the device 1305 may support techniques for improved communication reliability, reduced latency, reduced power consumption, more efficient utilization of communication resources, and improved coordination between devices, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for indicating backscattering timing as described herein, or the processor 1335 and the memory 1325 may be otherwise configured to perform or support such operations.

FIG. 14 illustrates a flowchart showing a method 1400 that supports techniques for indicating backscattering timing in accordance with one or more aspects of the present disclosure. The operations of the method 1400 may be implemented by a UE or a network entity or its components as described herein. For example, the operations of the method 1400 may be performed by a UE 115 or a network entity as described with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include receiving, from a wireless device, a message that includes timing information that indicates when the energy harvesting device is to begin backscattering of a wireless signal of the wireless device. The operations of 1405 may be performed in accordance with examples as disclosed herein. In some examples, aspects of the operations of 1405 may be performed by a backscattering timing component 1125 as described with reference to FIG. 11.

At 1410, the method may include monitoring for the wireless signal from the wireless device based on the message. The operations of 1410 may be performed in accordance with examples as disclosed herein. In some examples, aspects of the operations of 1410 may be performed by an energy transfer component 1130 as described with reference to FIG. 11.

At 1415, the method may include transmitting a backscattered signal based on application of a backscattering function to the wireless signal in accordance with the timing information. The operations of 1415 may be performed in accordance with examples as disclosed herein. In some examples, aspects of the operations of 1415 may be performed by a backscattering component 1135 as described with reference to FIG. 11.

FIG. 15 illustrates a flowchart showing a method 1500 that supports techniques for indicating backscattering timing in accordance with one or more aspects of the present disclosure. The operations of the method 1500 may be implemented by a UE or a network entity or its components as described herein. For example, the operations of the method 1500 may be performed by a UE 115 or a network entity as described with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include receiving, from a wireless device, a message that indicates a timing sequence identifying when the energy harvesting device is to begin backscattering of a wireless signal. The operations of 1505 may be performed in accordance with examples as disclosed herein. In some examples, aspects of the operations of 1505 may be performed by a backscattering timing component 1125 as described with reference to FIG. 11.

At 1510, the method may include receiving, via a field in the message, an indication of a scaling factor for scaling the timing sequence. The operations of 1510 may be performed in accordance with examples as disclosed herein. In some examples, aspects of the operations of 1510 may be performed by a scaling factor component 1165 as described with reference to FIG. 11.

At 1515, the method may include monitoring for the wireless signal from the wireless device based on the message. The operations of 1515 may be performed in accordance with examples as disclosed herein. In some examples, aspects of the operations of 1515 may be performed by an energy transfer component 1130 as described with reference to FIG. 11.

At 1520, the method may include applying a backscattering function to the wireless signal beginning at a time after the message is received, the time determined based on a product of the scaling factor and a time duration indicated by the timing sequence. The operations of 1520 may be performed in accordance with examples as disclosed herein. In some examples, aspects of the operations of 1520 may be performed by a backscattering timing component 1125 as described with reference to FIG. 11.

At 1525, the method may include transmitting a backscattered signal based on application of the backscattering function to the wireless signal in accordance with the product of the scaling factor and the time duration. The operations of 1525 may be performed in accordance with examples as disclosed herein. In some examples, aspects of the operations of 1525 may be performed by a backscattering component 1135 as described with reference to FIG. 11.

FIG. 16 illustrates a flowchart showing a method 1600 that supports techniques for indicating backscattering timing in accordance with one or more aspects of the present disclosure. The operations of the method 1600 may be implemented by a UE or a network entity or its components as described herein. For example, the operations of the method 1600 may be performed by a UE 115 or a network entity as described with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include receiving, from a wireless device, a message that includes timing information that indicates when the energy harvesting device is to begin backscattering of a wireless signal of the wireless device. The operations of 1605 may be performed in accordance with examples as disclosed herein. In some examples, aspects of the operations of 1605 may be performed by a backscattering timing component 1125 as described with reference to FIG. 11.

At 1610, the method may include transmitting a feedback message that acknowledges receipt of the message including the timing information. The operations of 1610 may be performed in accordance with examples as disclosed herein. In some examples, aspects of the operations of 1610 may be performed by a feedback component 1150 as described with reference to FIG. 11.

At 1615, the method may include monitoring for the wireless signal from the wireless device based on the message. The operations of 1615 may be performed in accordance with examples as disclosed herein. In some examples, aspects of the operations of 1615 may be performed by an energy transfer component 1130 as described with reference to FIG. 11.

At 1620, the method may include applying a backscattering function to the wireless signal beginning at a first time that is offset relative to the feedback message, where the timing information indicates the offset. The operations of 1620 may be performed in accordance with examples as disclosed herein. In some examples, aspects of the operations of 1620 may be performed by a backscattering timing component 1125 as described with reference to FIG. 11.

At 1625, the method may include transmitting a backscattered signal based on application of the backscattering function to the wireless signal in accordance with the timing information. The operations of 1625 may be performed in accordance with examples as disclosed herein. In some examples, aspects of the operations of 1625 may be performed by a backscattering component 1135 as described with reference to FIG. 11.

Figure 17:
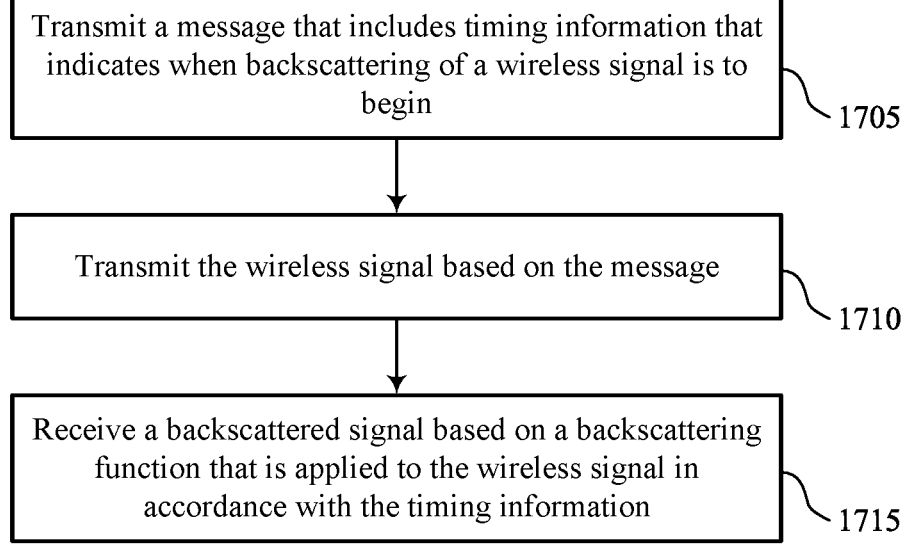

FIG. 17 illustrates a flowchart showing a method 1700 that supports techniques for indicating backscattering timing in accordance with one or more aspects of the present disclosure. The operations of the method 1700 may be implemented by a UE or a network entity or its components as described herein. For example, the operations of the method 1700 may be performed by a UE 115 or a network entity as described with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1705, the method may include transmitting a message that includes timing information that indicates when backscattering of a wireless signal is to begin. The operations of 1705 may be performed in accordance with examples as disclosed herein. In some examples, aspects of the operations of 1705 may be performed by a backscattering timing component 1125 as described with reference to FIG. 11.

At 1710, the method may include transmitting the wireless signal based on the message. The operations of 1710 may be performed in accordance with examples as disclosed herein. In some examples, aspects of the operations of 1710 may be performed by an energy transfer component 1130 as described with reference to FIG. 11.

At 1715, the method may include receiving a backscattered signal based on a backscattering function that is applied to the wireless signal in accordance with the timing information. The operations of 1715 may be performed in accordance with examples as disclosed herein. In some examples, aspects of the operations of 1715 may be performed by a backscattered signal component 1140 as described with reference to FIG. 11.

Figure 18:
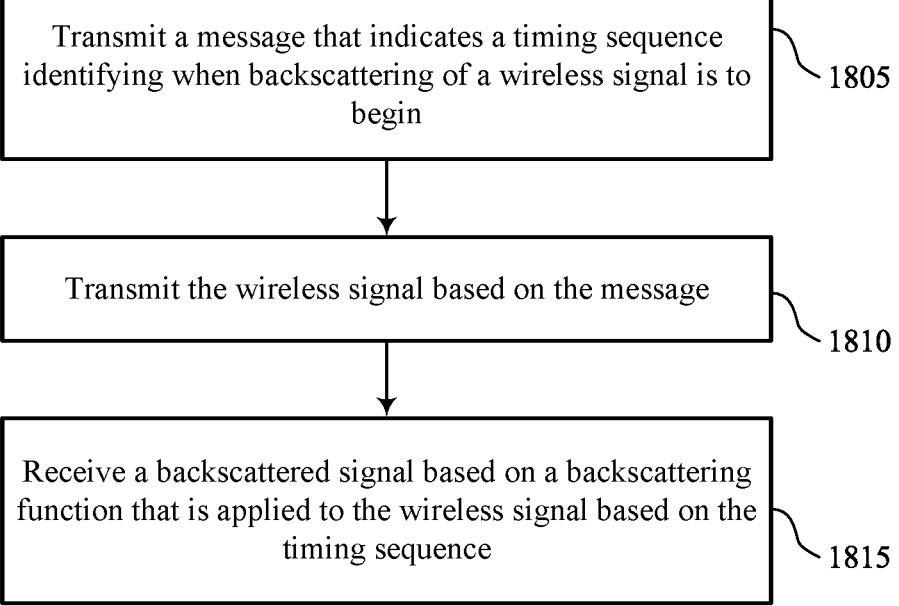

FIG. 18 illustrates a flowchart showing a method 1800 that supports techniques for indicating backscattering timing in accordance with one or more aspects of the present disclosure. The operations of the method 1800 may be implemented by a UE or a network entity or its components as described herein. For example, the operations of the method 1800 may be performed by a UE 115 or a network entity as described with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1805, the method may include transmitting a message that indicates a timing sequence identifying when backscattering of a wireless signal is to begin. The operations of 1805 may be performed in accordance with examples as disclosed herein. In some examples, aspects of the operations of 1805 may be performed by a backscattering timing component 1125 as described with reference to FIG. 11.

At 1810, the method may include transmitting the wireless signal based on the message. The operations of 1810 may be performed in accordance with examples as disclosed herein. In some examples, aspects of the operations of 1810 may be performed by an energy transfer component 1130 as described with reference to FIG. 11.

At 1815, the method may include receiving a backscattered signal based on a backscattering function that is applied to the wireless signal based on the timing sequence. The operations of 1815 may be performed in accordance with examples as disclosed herein. In some examples, aspects of the operations of 1815 may be performed by a backscattered signal component 1140 as described with reference to FIG. 11.

Figure 19:
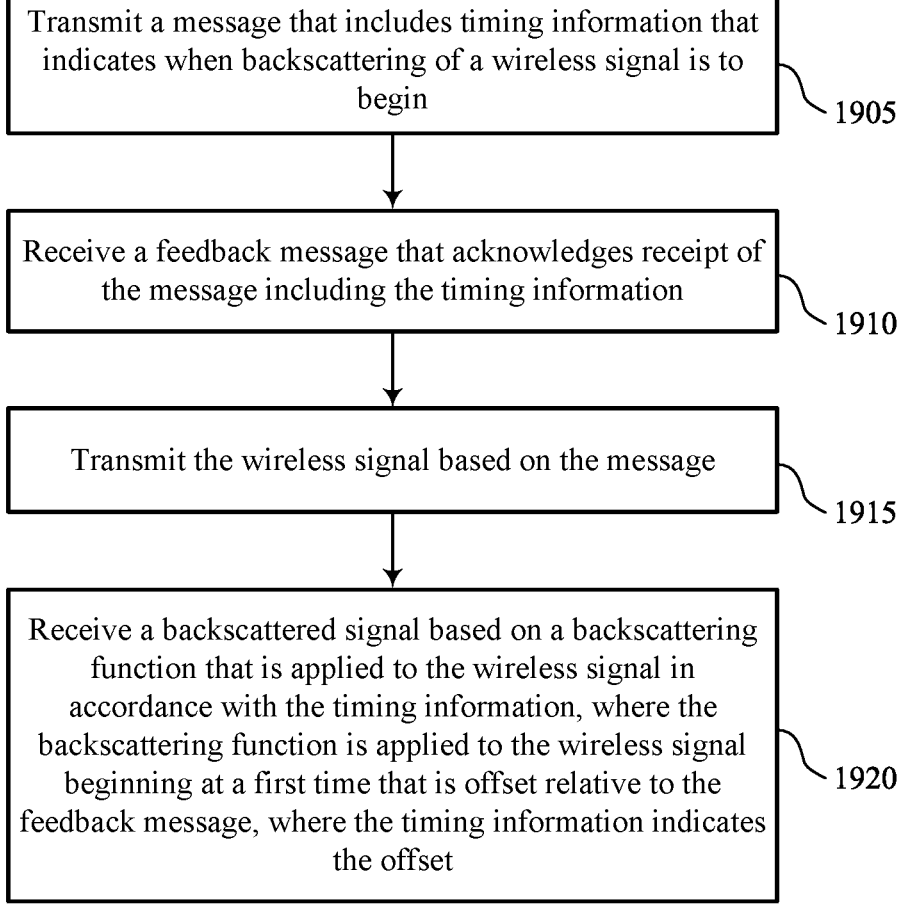

FIG. 19 illustrates a flowchart showing a method 1900 that supports techniques for indicating backscattering timing in accordance with one or more aspects of the present disclosure. The operations of the method 1900 may be implemented by a UE or a network entity or its components as described herein. For example, the operations of the method 1900 may be performed by a UE 115 or a network entity as described with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1905, the method may include transmitting a message that includes timing information that indicates when backscattering of a wireless signal is to begin. The operations of 1905 may be performed in accordance with examples as disclosed herein. In some examples, aspects of the operations of 1905 may be performed by a backscattering timing component 1125 as described with reference to FIG. 11.

At 1910, the method may include receiving a feedback message that acknowledges receipt of the message including the timing information, where the backscattering function is applied to the wireless signal beginning at a first time that is offset relative to the feedback message, where the timing information indicates the offset. The operations of 1910 may be performed in accordance with examples as disclosed herein. In some examples, aspects of the operations of 1910 may be performed by a feedback component 1150 as described with reference to FIG. 11.

At 1915, the method may include transmitting the wireless signal based on the message. The operations of 1915 may be performed in accordance with examples as disclosed herein. In some examples, aspects of the operations of 1915 may be performed by an energy transfer component 1130 as described with reference to FIG. 11.

At 1920, the method may include receiving a backscattered signal based on a backscattering function that is applied to the wireless signal in accordance with the timing information. The operations of 1920 may be performed in accordance with examples as disclosed herein. In some examples, aspects of the operations of 1920 may be performed by a backscattered signal component 1140 as described with reference to FIG. 11.

The following provides an overview of aspects of the present disclosure:

Aspect 1: A method for wireless communication at an energy harvesting device, comprising: receiving, from a wireless device, a message that comprises timing information that indicates when the energy harvesting device is to begin backscattering of a wireless signal of the wireless device; monitoring for the wireless signal from the wireless device based at least in part on the message; and transmitting a backscattered signal based at least in part on application of a backscattering function to the wireless signal in accordance with the timing information.

Aspect 2: The method of aspect 1, wherein receiving the message that comprises the timing information comprises: receiving the message that indicates the timing information as a first codepoint of a set of one or more codepoints for a backscattering timer, wherein the backscattering function is applied to the wireless signal after an expiration of the backscattering timer.

Aspect 3: The method of aspect 2, further comprising: receiving a timing synchronization signal for synchronizing timing between the backscattering timer and the wireless device.

Aspect 4: The method of aspect 1, wherein receiving the message that comprises the timing information comprises: receiving the message that indicates the timing information as a first codepoint of a set of one or more codepoints, the first codepoint indicating a time offset between reception of the message and when to begin the backscattering of the wireless signal, wherein the backscattering function is applied to the wireless signal based at least in part on the time offset.

Aspect 5: The method of aspect 1, wherein receiving the message that comprises the timing information comprises: receiving the message that indicates a timing sequence identifying when the energy harvesting device is to begin the backscattering of the wireless signal, wherein the backscattering function is applied to the wireless signal based at least in part on the timing sequence.

Aspect 6: The method of aspect 5, further comprising: receiving a transmission comprising a delimiter indicating a start of the timing sequence, wherein the backscattering function is applied to the wireless signal based at least in part on the timing sequence and the delimiter.

Aspect 7: The method of any of aspects 5 through 6, further comprising: applying the backscattering function to the wireless signal after detecting an end of reception of the timing sequence.

Aspect 8: The method of any of aspects 5 through 6, wherein receiving the message that comprises the timing information comprises: receiving, via a field in the message, an indication of a scaling factor for scaling the timing sequence; and applying the backscattering function to the wireless signal beginning at a time after the message is received, the time determined based at least in part on a product of the scaling factor and a time duration indicated by the timing sequence.

Aspect 9: The method of aspect 8, further comprising: selecting the scaling factor from among a plurality of scaling factors indicated via the message based at least in part on an index of the scaling factor associated with the energy harvesting device, wherein each scaling factor of the plurality of scaling factors is associated with a respective energy harvesting device of a plurality of energy harvesting devices.

Aspect 10: The method of any of aspects 1 through 9, further comprising: transmitting a feedback message that acknowledges receipt of the message comprising the timing information.

Aspect 11: The method of aspect 10, further comprising: applying the backscattering function to the wireless signal beginning at a first time that is offset relative to the feedback message, wherein the timing information indicates the offset.

Aspect 12: The method of aspect 11, wherein the offset is relative to a beginning symbol period or an ending symbol period of the feedback message.

Aspect 13: The method of any of aspects 1 through 12, further comprising: receiving the wireless signal, wherein the wireless signal comprises a reference signal or a PRS.

Aspect 14: A method for wireless communication at an energy transferring device, comprising: transmitting a message that comprises timing information that indicates when backscattering of a wireless signal is to begin; transmitting the wireless signal based at least in part on the message; and receiving a backscattered signal based at least in part on a backscattering function that is applied to the wireless signal in accordance with the timing information.

Aspect 15: The method of aspect 14, wherein transmitting the message that comprises the timing information comprises: transmitting the message that indicates the timing information as a first codepoint of a set of one or more codepoints for a backscattering timer, wherein the backscattering function is applied to the wireless signal after an expiration of the backscattering timer.

Aspect 16: The method of aspect 15, further comprising: transmitting a timing synchronization signal for synchronizing timing between the backscattering timer and the energy transferring device.

Aspect 17: The method of aspect 14, wherein transmitting the message that comprises the timing information comprises: transmitting the message that indicates the timing information as a first codepoint of a set of one or more codepoints, the first codepoint indicating a time offset between reception of the message and when to begin the backscattering of the wireless signal, wherein the backscattering function is applied to the wireless signal based at least in part on the time offset.

Aspect 18: The method of aspect 14, wherein transmitting the message that comprises the timing information comprises: transmitting the message that indicates a timing sequence identifying when the backscattering of the wireless signal is to begin, wherein the backscattering function is applied to the wireless signal based at least in part on the timing sequence.

Aspect 19: The method of aspect 18, further comprising: transmitting a transmission comprising a delimiter indicating a start of the timing sequence, wherein the backscattering function is applied to the wireless signal based at least in part on the timing sequence and the delimiter.

Aspect 20: The method of any of aspects 18 through 19, wherein transmitting the message that comprises the timing information comprises: transmitting, via a field in the message, an indication of a scaling factor for scaling the timing sequence, wherein the backscattering function is applied to the wireless signal beginning at a second time after the message is received, the second time determined based at least in part on a product of the scaling factor and a time duration indicated by the timing sequence.

Aspect 21: The method of any of aspects 18 through 20, wherein transmitting the message that comprises the timing information comprises: transmitting, via one or more fields in the message, an indication of a plurality of scaling factors for scaling the timing sequence, wherein each scaling factor of the plurality of scaling factors is associated with a respective energy harvesting device of a plurality of energy harvesting devices.

Aspect 22: The method of aspect 21, further comprising: receiving a plurality of backscattered signals comprising the backscattered signal, wherein each backscattered signal of the plurality of backscattered signals is received from a respective energy harvesting device of the plurality of energy harvesting devices at a respective time after the message is transmitted, the respective time based at least in part on a scaling factor of the plurality of scaling factors that is associated with the respective energy harvesting device.

Aspect 23: The method of any of aspects 14 through 22, further comprising: receiving a feedback message that acknowledges receipt of the message comprising the timing information, wherein the backscattering function is applied to the wireless signal beginning at a first time that is offset relative to the feedback message, wherein the timing information indicates the offset.

Aspect 24: The method of aspect 23, further comprising: wherein the offset is relative to a beginning symbol period or an ending symbol period of the feedback message.

Aspect 25: The method of any of aspects 14 through 24, further comprising: determining a position of an energy harvesting device based at least in part on receiving the backscattered signal, wherein the wireless signal comprises a reference signal or a PRS.

Aspect 26: An apparatus for wireless communication at an energy harvesting device, comprising a processor; memory coupled with the processor; and instructions stored in the memory and executable by the processor to cause the apparatus to perform a method of any of aspects 1 through 13.

Aspect 27: An apparatus for wireless communication at an energy harvesting device, comprising at least one means for performing a method of any of aspects 1 through 13.

Aspect 28: A non-transitory computer-readable medium storing code for wireless communication at an energy harvesting device, the code comprising instructions executable by a processor to perform a method of any of aspects 1 through 13.

Aspect 29: An apparatus for wireless communication at an energy transferring device, comprising a processor; memory coupled with the processor; and instructions stored in the memory and executable by the processor to cause the apparatus to perform a method of any of aspects 14 through 25.

Aspect 30: An apparatus for wireless communication at an energy transferring device, comprising at least one means for performing a method of any of aspects 14 through 25.

Aspect 31: A non-transitory computer-readable medium storing code for wireless communication at an energy transferring device, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at an energy harvesting device, comprising:
 a processor;
 memory coupled with the processor; and
 instructions stored in the memory and executable by the processor to cause the apparatus to:
  receive, from a wireless device, a message that comprises timing information that indicates when the energy harvesting device is to begin backscattering of a wireless signal of the wireless device;
  monitor for the wireless signal from the wireless device based at least in part on the message; and
  transmit a backscattered signal based at least in part on application of a backscattering function to the wireless signal in accordance with the timing information.

2. The apparatus of claim 1, wherein the instructions are further executable by the processor to receive the message that comprises the timing information by being executable by the processor to:
 receive the message that indicates the timing information as a first codepoint of a set of one or more codepoints for a backscattering timer, wherein the backscattering function is applied to the wireless signal after an expiration of the backscattering timer.

3. The apparatus of claim 2, wherein the instructions are further executable by the processor to cause the apparatus to:
 receive a timing synchronization signal for synchronizing timing between the backscattering timer and the wireless device.

4. The apparatus of claim 1, wherein the instructions are further executable by the processor to receive the message that comprises the timing information by being executable by the processor to:
 receive the message that indicates the timing information as a first codepoint of a set of one or more codepoints, the first codepoint indicating a time offset between reception of the message and when to begin the backscattering of the wireless signal, wherein the backscattering function is applied to the wireless signal based at least in part on the time offset.

5. The apparatus of claim 1, wherein the instructions are further executable by the processor to receive the message that comprises the timing information by being executable by the processor to:
 receive the message that indicates a timing sequence identifying when the energy harvesting device is to begin the backscattering of the wireless signal, wherein the backscattering function is applied to the wireless signal based at least in part on the timing sequence.

6. The apparatus of claim 5, wherein the instructions are further executable by the processor to cause the apparatus to:
 receive a transmission comprising a delimiter indicating a start of the timing sequence, wherein the backscattering function is applied to the wireless signal based at least in part on the timing sequence and the delimiter.

7. The apparatus of claim 5, wherein the instructions are further executable by the processor to cause the apparatus to:
 apply the backscattering function to the wireless signal after detecting an end of reception of the timing sequence.

8. The apparatus of claim 5, wherein the instructions are further executable by the processor to receive the message that comprises the timing information by being executable by the processor to:
 receive, via a field in the message, an indication of a scaling factor for scaling the timing sequence; and
 apply the backscattering function to the wireless signal beginning at a time after the message is received, the time determined based at least in part on a product of the scaling factor and a time duration indicated by the timing sequence.

9. The apparatus of claim 8, wherein the instructions are further executable by the processor to cause the apparatus to:
 select the scaling factor from among a plurality of scaling factors indicated via the message based at least in part on an index of the scaling factor associated with the energy harvesting device, wherein each scaling factor of the plurality of scaling factors is associated with a respective energy harvesting device of a plurality of energy harvesting devices.

10. The apparatus of claim 1, wherein the instructions are further executable by the processor to cause the apparatus to:
 transmit a feedback message that acknowledges receipt of the message comprising the timing information.

11. The apparatus of claim 10, wherein the instructions are further executable by the processor to cause the apparatus to:
 apply the backscattering function to the wireless signal beginning at a first time that is offset relative to the feedback message, wherein the timing information indicates the offset.

12. The apparatus of claim 11, wherein the offset is relative to a beginning symbol period or an ending symbol period of the feedback message.

13. The apparatus of claim 1, wherein the instructions are further executable by the processor to cause the apparatus to:
 receive the wireless signal, wherein the wireless signal comprises a reference signal or a positioning reference signal.

14. An apparatus for wireless communication at an energy transferring device, comprising:
 a processor;
 memory coupled with the processor; and
 instructions stored in the memory and executable by the processor to cause the apparatus to:
  transmit, to an energy harvesting device, a message that comprises timing information that indicates when the energy harvesting device is to begin backscattering of a wireless signal of the energy transferring device;
  transmit the wireless signal based at least in part on the message; and receive a backscattered signal based at least in part on a backscattering function that is applied to the wireless signal in accordance with the timing information.

15. The apparatus of claim 14, wherein the instructions are further executable by the processor to transmit the message that comprises the timing information by being executable by the processor to:

transmit the message that indicates the timing information as a first codepoint of a set of one or more codepoints for a backscattering timer, wherein the backscattering function is applied to the wireless signal after an expiration of the backscattering timer.

16. The apparatus of claim 15, wherein the instructions are further executable by the processor to cause the apparatus to:

transmit a timing synchronization signal for synchronizing timing between the backscattering timer and the energy transferring device.

17. The apparatus of claim 14, wherein the instructions are further executable by the processor to transmit the message that comprises the timing information by being executable by the processor to:

transmit the message that indicates the timing information as a first codepoint of a set of one or more codepoints, the first codepoint indicating a time offset between reception of the message and when to begin the backscattering of the wireless signal, wherein the backscattering function is applied to the wireless signal based at least in part on the time offset.

18. The apparatus of claim 14, wherein the instructions are further executable by the processor to transmit the message that comprises the timing information by being executable by the processor to:

transmit the message that indicates a timing sequence identifying when the backscattering of the wireless signal is to begin, wherein the backscattering function is applied to the wireless signal based at least in part on the timing sequence.

19. The apparatus of claim 18, wherein the instructions are further executable by the processor to cause the apparatus to:

transmit a transmission comprising a delimiter indicating a start of the timing sequence, wherein the backscattering function is applied to the wireless signal based at least in part on the timing sequence and the delimiter.

20. The apparatus of claim 18, wherein the instructions are further executable by the processor to transmit the message that comprises the timing information by being executable by the processor to:

transmit, via a field in the message, an indication of a scaling factor for scaling the timing sequence, wherein the backscattering function is applied to the wireless signal beginning at a second time after the message is received, the second time determined based at least in part on a product of the scaling factor and a time duration indicated by the timing sequence.

21. The apparatus of claim 18, wherein the instructions are further executable by the processor to transmit the message that comprises the timing information by being executable by the processor to:

transmit, via one or more fields in the message, an indication of a plurality of scaling factors for scaling the timing sequence, wherein each scaling factor of the plurality of scaling factors is associated with a respective energy harvesting device of a plurality of energy harvesting devices.

22. The apparatus of claim 21, wherein the instructions are further executable by the processor to cause the apparatus to:

receive a plurality of backscattered signals comprising the backscattered signal, wherein each backscattered signal of the plurality of backscattered signals is received from a respective energy harvesting device of the plurality of energy harvesting devices at a respective time after the message is transmitted, the respective time based at least in part on a scaling factor of the plurality of scaling factors that is associated with the respective energy harvesting device.

23. The apparatus of claim 14, wherein the instructions are further executable by the processor to cause the apparatus to:

receive a feedback message that acknowledges receipt of the message comprising the timing information, wherein the backscattering function is applied to the wireless signal beginning at a first time that is offset relative to the feedback message, wherein the timing information indicates the offset, and wherein the offset is relative to a beginning symbol period or an ending symbol period of the feedback message.

24. The apparatus of claim 14, wherein the instructions are further executable by the processor to cause the apparatus to:

determine a position of the energy harvesting device based at least in part on receiving the backscattered signal, wherein the wireless signal comprises a reference signal or a positioning reference signal.

25. A method for wireless communication at an energy harvesting device, comprising:

receiving, from a wireless device, a message that comprises timing information that indicates when the energy harvesting device is to begin backscattering of a wireless signal of the wireless device;

monitoring for the wireless signal from the wireless device based at least in part on the message; and transmitting a backscattered signal based at least in part on application of a backscattering function to the wireless signal in accordance with the timing information.

26. The method of claim 25, wherein receiving the message that comprises the timing information comprises:

receiving the message that indicates the timing information as a first codepoint of a set of one or more codepoints for a backscattering timer, wherein the backscattering function is applied to the wireless signal after an expiration of the backscattering timer.

27. The method of claim 25, wherein receiving the message that comprises the timing information comprises:

receiving the message that indicates the timing information as a first codepoint of a set of one or more codepoints, the first codepoint indicating a time offset between reception of the message and when to begin the backscattering of the wireless signal, wherein the backscattering function is applied to the wireless signal based at least in part on the time offset.

28. A method for wireless communication at an energy transferring device, comprising:

transmitting, to an energy harvesting device, a message that comprises timing information that indicates when the energy harvesting device is to begin backscattering of a wireless signal of the energy transferring device;

transmitting the wireless signal based at least in part on the message; and receiving a backscattered signal based at least in part on a backscattering function that is applied to the wireless signal in accordance with the timing information.

29. The method of claim 28, wherein transmitting the message that comprises the timing information comprises:

transmitting the message that indicates the timing information as a first codepoint of a set of one or more codepoints for a backscattering timer, wherein the backscattering function is applied to the wireless signal after an expiration of the backscattering timer.

30. The apparatus of claim 1, wherein the timing information comprises at least one of:

a first codepoint of a set of one or more codepoints for a backscattering timer identifying that the energy harvesting device is to begin the backscattering of the wireless signal after expiration of the backscattering timer;

a first codepoint of a set of one or more codepoints for a time offset between reception of the message and when the energy harvesting device is to begin the backscattering of the wireless signal; or a timing sequence identifying when the energy harvesting device is to begin the backscattering of the wireless signal.

* * * * *